(12) United States Patent
Barnum et al.

(10) Patent No.: US 11,056,074 B2
(45) Date of Patent: Jul. 6, 2021

(54) CLOUD-BASED COMPONENT LINKING IN A SMART WINDOW SYSTEM

(71) Applicant: Kinestral Technologies, Inc., Hayward, CA (US)

(72) Inventors: Walter Thomas Barnum, Salt Lake City, UT (US); Jason Aaron Litzinger, Salt Lake City, UT (US); William S. O'Dell, Kerns, UT (US)

(73) Assignee: KINESTRAL TECHNOLOGIES, INC., Hayward, CA (US)

( * ) Notice: Subject to any disclaimer, the term of this patent is extended or adjusted under 35 U.S.C. 154(b) by 0 days.

(21) Appl. No.: 16/786,719

(22) Filed: Feb. 10, 2020

(65) Prior Publication Data
US 2020/0258470 A1    Aug. 13, 2020

Related U.S. Application Data

(60) Provisional application No. 62/805,096, filed on Feb. 13, 2019.

(51) Int. Cl.
| | |
|---|---|
| *G06F 3/0482* | (2013.01) |
| *G09G 3/38* | (2006.01) |
| *G09G 3/20* | (2006.01) |
| *G06F 3/0485* | (2013.01) |

(Continued)

(52) U.S. Cl.
CPC .............. *G09G 3/38* (2013.01); *G06F 3/0482* (2013.01); *G06F 3/0485* (2013.01);
(Continued)

(58) Field of Classification Search
CPC .... G09G 3/38; G09G 3/2096; G09G 2354/00; G09G 2370/022; G05B 2219/2642;
(Continued)

(56) References Cited

U.S. PATENT DOCUMENTS

| | | | |
|---|---|---|---|
| 10,365,531 B2* | 7/2019 | Shrivastava | G08C 23/04 |
| 2015/0097689 A1* | 4/2015 | Logue | H04W 4/38 |
| | | | 340/632 |

(Continued)

FOREIGN PATENT DOCUMENTS

| | | |
|---|---|---|
| CA | 3044823 A1 | 5/2018 |
| WO | 2013155467 A1 | 10/2013 |

(Continued)

OTHER PUBLICATIONS

International Search Report and Written Opinion dated Jun. 12, 2020, on application No. PCT/US2020/017986.

*Primary Examiner* — Anil K Bhargava
(74) *Attorney, Agent, or Firm* — Lowenstein Sandler LLP

(57) ABSTRACT

A method includes identifying components of a smart window system. The components include electrochromic devices, drivers, and one or more gateways. Each of the drivers is to control a corresponding electrochromic device and each of the drivers is to receive instructions from a server device via a corresponding gateway. The method further includes determining physical linking, network linking, and application linking of the smart window system. The method further includes displaying, via a graphical user interface (GUI), the components of the smart window system, the physical linking, the network linking, and the application linking. The method further includes determining a first component of the plurality of components is to be replaced by a new component, causing the new component to be configured based on configurations of the first component, and updating the GUI based on the new component that has been configured based on the configurations of the first component.

17 Claims, 12 Drawing Sheets

(51) Int. Cl.
*H04L 29/08* (2006.01)
*G06F 3/0486* (2013.01)

(52) U.S. Cl.
CPC ......... *G06F 3/0486* (2013.01); *G09G 3/2096* (2013.01); *H04L 67/125* (2013.01); *G09G 2354/00* (2013.01); *G09G 2370/022* (2013.01)

(58) Field of Classification Search
CPC ........ G05B 2219/2628; H04L 12/2803; H04L 12/2816; H04L 67/125; B60J 3/04; G06F 3/0482; G06F 3/0485; G06F 3/0486
See application file for complete search history.

(56) References Cited

U.S. PATENT DOCUMENTS

| | | | |
|---|---|---|---|
| 2016/0154290 A1* | 6/2016 | Brown | E06B 3/6722 |
| | | | 359/275 |
| 2016/0203403 A1* | 7/2016 | Nagel | H04L 51/32 |
| | | | 706/61 |
| 2017/0093915 A1* | 3/2017 | Ellis | H04L 67/306 |
| 2017/0285433 A1* | 10/2017 | Shrivastava | G06Q 10/06 |
| 2018/0059520 A1* | 3/2018 | Dubois | H03K 17/962 |
| 2018/0144162 A1* | 5/2018 | Barnum | G08C 17/02 |
| 2019/0294018 A1* | 9/2019 | Shrivastava | G05B 15/02 |
| 2020/0159096 A1* | 5/2020 | Dubois | H03K 17/962 |

FOREIGN PATENT DOCUMENTS

| | | |
|---|---|---|
| WO | 2018067377 A1 | 4/2018 |
| WO | 2018098336 A1 | 5/2018 |

\* cited by examiner

Site Architecture     GUI 400B

- Location-Site [Edit]
  - Sensor Hub [Edit] [Close]
  - Range Extender [Edit] [Close]
  - Façade [Edit] [Close]
  - Interior Sensor [Edit] [Close]
  - Cabinet [Edit] [Close]
    - Driver 1 [Edit] [Close]
    - Driver 2 [Edit] [Close]
    - Gateway [Edit] [Close]
    - Distributed EMS [Edit] [Close]
  - Location 2 [Edit] [Close]
    - Location 3 [Edit] [Close]
      - Frame [Edit] [Close]
        - EC Window 1 [Edit] [Close]
        - EC Window 2 [Edit] [Close]

Edit [Save] [Cancel]
Id:85191d24...

Name: Sensor Hub

Part ID: Part ID

Hardware ID: Hardware ID

Site Architecture     GUI 400C

- Location-Site [Edit]
  - Sensor Hub [Edit] [Close]
  - Range Extender [Edit] [Close]
  - Façade [Edit] [Close]
  - Interior Sensor [Edit] [Close]
  - Cabinet [Edit] [Close]
    - Driver 1 [Edit] [Close]
    - Driver 2 [Edit] [Close]
    - Gateway [Edit] [Close]
    - Distributed EMS [Edit] [Close]
  - Location 2 [Edit] [Close]
    - Location 3 [Edit] [Close]
      - Frame [Edit] [Close]
        - EC Window 1 [Edit] [Close]
        - EC Window 2 [Edit] [Close]

Edit [Save] [Cancel]
Id:d15c9133...

Name: Range Extender

Part ID: Part ID

Hardware ID: Hardware ID

Links
Gateway: Gateway

FIG. 4C

Site Architecture GUI 400D

| | | | |
|---|---|---|---|
| 🏠 v | Location-Site | | Edit |
| ≡ | Sensor Hub | Edit | Close |
| ≡ | Range Extender | Edit | Close |
| ≡ | Façade | Edit | Close |
| ≡ | Interior Sensor | Edit | Close |
| ≡ v | Cabinet | Edit | Close |
| ≡ | Driver 1 | Edit | Close |
| ≡ | Driver 2 | Edit | Close |
| ≡ | Gateway | Edit | Close |
| ≡ | Distributed EMS | Edit | Close |
| ≡ v | Location 2 | Edit | Close |
| ≡ v | Location 3 | Edit | Close |
| ≡ v | Frame | Edit | Close |
| ≡ | EC Window 1 | Edit | Close |
| ≡ | EC Window 2 | Edit | Close |

Edit  [Save] [Cancel]
Id:6c96ee6f...

Name
[Façade]

Façade Angles
(units are in degrees)
Orientation
(N=0, E=90, S=180, W=270)
[        ]

Inclination
(vertical=90)
(external leaning>90, max=180)
(internal leaning<90, min=0,
example=skylight)
[        ]

Linked Via
Type   To
Façade [EC Window 2] Remove
Façade [EC Window 1] Remove

Site Architecture GUI 400E

| | | | |
|---|---|---|---|
| 🏠 v | Location-Site | | Edit |
| ≡ | Sensor Hub | Edit | Close |
| ≡ | Range Extender | Edit | Close |
| ≡ | Façade | Edit | Close |
| ≡ | Interior Sensor | Edit | Close |
| ≡ v | Cabinet | Edit | Close |
| ≡ | Driver 1 | Edit | Close |
| ≡ | Driver 2 | Edit | Close |
| ≡ | Gateway | Edit | Close |
| ≡ | Distributed EMS | Edit | Close |
| ≡ v | Location 2 | Edit | Close |
| ≡ v | Location 3 | Edit | Close |
| ≡ v | Frame | Edit | Close |
| ≡ | EC Window 1 | Edit | Close |
| ≡ | EC Window 2 | Edit | Close |

Edit  [Save] [Cancel]
Id:719d42e2...

Name
[Interior Sensor]

Part ID
[Part ID]

Hardware ID
[Hardware ID]

Links
Gateway
[Gateway ↕]

FIG. 4E

Site Architecture                                                         GUI 400F

- Location-Site [Edit]                    Edit    [Save] [Cancel]
  - Sensor Hub [Edit] [Close]             Id:28dfd9ae...
  - Range Extender [Edit] [Close]
  - Façade [Edit] [Close]                 Name
  - Interior Sensor [Edit] [Close]        [Driver 1]
  - Cabinet [Edit] [Close]                Part ID
    - Driver 1 [Edit] [Close]             [Part ID]
    - Driver 2 [Edit] [Close]             Hardware ID
    - Gateway [Edit] [Close]              [Hardware ID]
    - Distributed EMS [Edit] [Close]      Device Configuration
  - Location 2 [Edit] [Close]             Positive Volt Drive Limit
    - Location 3 [Edit] [Close]           [0.0]
      - Frame [Edit] [Close]              Negative Volt Drive Limit
        - EC Window 1 [Edit] [Close]      [0.0]
        - EC Window 2 [Edit] [Close]      Positive Volt Sense Limit
                                          [0.0]
                                          Negative Volt Sense Limit
                                          [0.0]

Links
                                          Gateway
                                          [Gateway ⇕]

Distributed EMS
                                          [Energy Manager ⇕]

Linked Via
                                          Type    To
                                          drive   [EC Window 1][Remove]

FIG. 4F

Site Architecture                                                    GUI 400G

- Location-Site [Edit]
  - Sensor Hub [Edit] [Close]
  - Range Extender [Edit] [Close]
  - Façade [Edit] [Close]
  - Interior Sensor [Edit] [Close]
  - Cabinet [Edit] [Close]
    - Driver 1 [Edit] [Close]
    - Driver 2 [Edit] [Close]
    - Gateway [Edit] [Close]
    - Distributed EMS [Edit] [Close]
  - Location 2 [Edit] [Close]
    - Location 3 [Edit] [Close]
      - Frame [Edit] [Close]
        - EC Window 1 [Edit] [Close]
        - EC Window 2 [Edit] [Close]

Edit  [Save] [Cancel]
Id:099fee05...

Name
[Gateway]

Part ID
[Part ID]

Hardware ID
[Hardware ID]

Device Configuration
Node Summary Push Interval
[100]

Thread Configuration
Thread Channel
[11]

Links
Distributed EMS
[Energy Manager ⇅]

Linked Via
| Type | To | |
|------|-----|-----|
| thread | Driver 1 | Rem. |
| thread | Interior Sensor | Rem. |
| thread | Driver 2 | Rem. |
| thread | Range Extender | Rem. |
| thread | Distributed EMS | Rem. |

FIG. 4G

Site Architecture GUI 400H

| | | |
|---|---|---|
| ⌂ v Location-Site | | Edit |
| ≡ Sensor Hub | Edit | Close |
| ≡ Range Extender | Edit | Close |
| ≡ Façade | Edit | Close |
| ≡ Interior Sensor | Edit | Close |
| ≡ v Cabinet | Edit | Close |
| ≡ Driver 1 | Edit | Close |
| ≡ Driver 2 | Edit | Close |
| ≡ Gateway | Edit | Close |
| ≡ Distributed EMS | Edit | Close |
| ≡ v Location 2 | Edit | Close |
| ≡ v Location 3 | Edit | Close |
| ≡ v Frame | Edit | Close |
| ≡ EC Window 1 | Edit | Close |
| ≡ EC Window 2 | Edit | Close |

Edit [Save] [Cancel]
Id:d65edbea...

Name
[Distributed EMS]

Part ID
[Part ID]

Hardware ID
[Hardware ID]

Links
Gateway
[Gateway ↕]

Linked Via
Type  To
power [Gateway]  [Remove]
power [Driver 1]  [Remove]
power [Driver 2]  [Remove]

FIG. 4H

Site Architecture

GUI 4001

- Location-Site [Edit]
  - Sensor Hub [Edit] [Close]
  - Range Extender [Edit] [Close]
  - Façade [Edit] [Close]
  - Interior Sensor [Edit] [Close]
  - Cabinet [Edit] [Close]
    - Driver 1 [Edit] [Close]
    - Driver 2 [Edit] [Close]
    - Gateway [Edit] [Close]
    - Distributed EMS [Edit] [Close]
  - Location 2 [Edit] [Close]
    - Location 3 [Edit] [Close]
      - Frame [Edit] [Close]
        - EC Window 1 [Edit] [Close]
        - EC Window 2 [Edit] [Close]

Edit  [Save] [Cancel]

Id:44fbf6f5...

Name
[EC Window 1]

Part ID
[Part ID]

Cable Length
[Cable Length]

Device Configuration
Max Tint Level
[100]

Min Tint Level
[0]

Links
Driver
[Driver 1]

Façade
[Façade]

Mask Image -s3fileName.png
(example = SLC...map.png)
[    ]

Target Setpoint Lower/Upper DNI Thresholds
(The target setpoint for DNI values below the low threshold are setpoint 0, whereas the target setpoint for DNI values above the high threshold are setpoint 8)

Low Threshold
[    ]

High Threshold
[    ]

Position Factor Weighting
(The position factor weighting affects the transmitted DNI values and is between 0 and 1.0. A position factor weighting closer to 0 helps reduce glare when the sun's incident angle with respect to the window is low.)

Position Factor Weight
[    ]

FIG. 4I

GUI 400J

Glare Control
Obstruction Mask
Parameters
(dimensions are in
meters)

Header Height
[ ]

Sill Height
[ ]

Jamb Depth
[ ]

Window Width
[ ]

Overhang Depth
[ ]

Overhang Height Above
Window Header
[ ]

Extension to Left
[ ]

Extension to Right
[ ]

Propagation Distance
[ ]

Propagation Height
[ ]

FIG. 4J

CLOUD-BASED COMPONENT LINKING IN A SMART WINDOW SYSTEM

RELATED APPLICATIONS

This application claims the benefit of U.S. Provisional No. 62/805,096, filed Feb. 13, 2019, the entire contents of which are incorporated by reference.

BACKGROUND

An electrochromic glass unit uses electrochromic glass that can change transmissivity with the application of electric current and voltage. The change of transmissivity typically relies on a reversible oxidation of a material. Electrochromic glass units can darken at the press of a button or other triggering events and are also often used in automobile rearview mirrors to reduce reflective glare.

BRIEF DESCRIPTION OF DRAWINGS

The present disclosure will be understood more fully from the detailed description given below and from the accompanying drawings of various embodiments, which, however, should not be taken to limit the present disclosure to the specific embodiments, but are for explanation and understanding only.

FIGS. 4A-J are graphical user interfaces (GUIs) for cloud-based component linking, according to certain embodiments.

DETAILED DESCRIPTION

Figure 1:
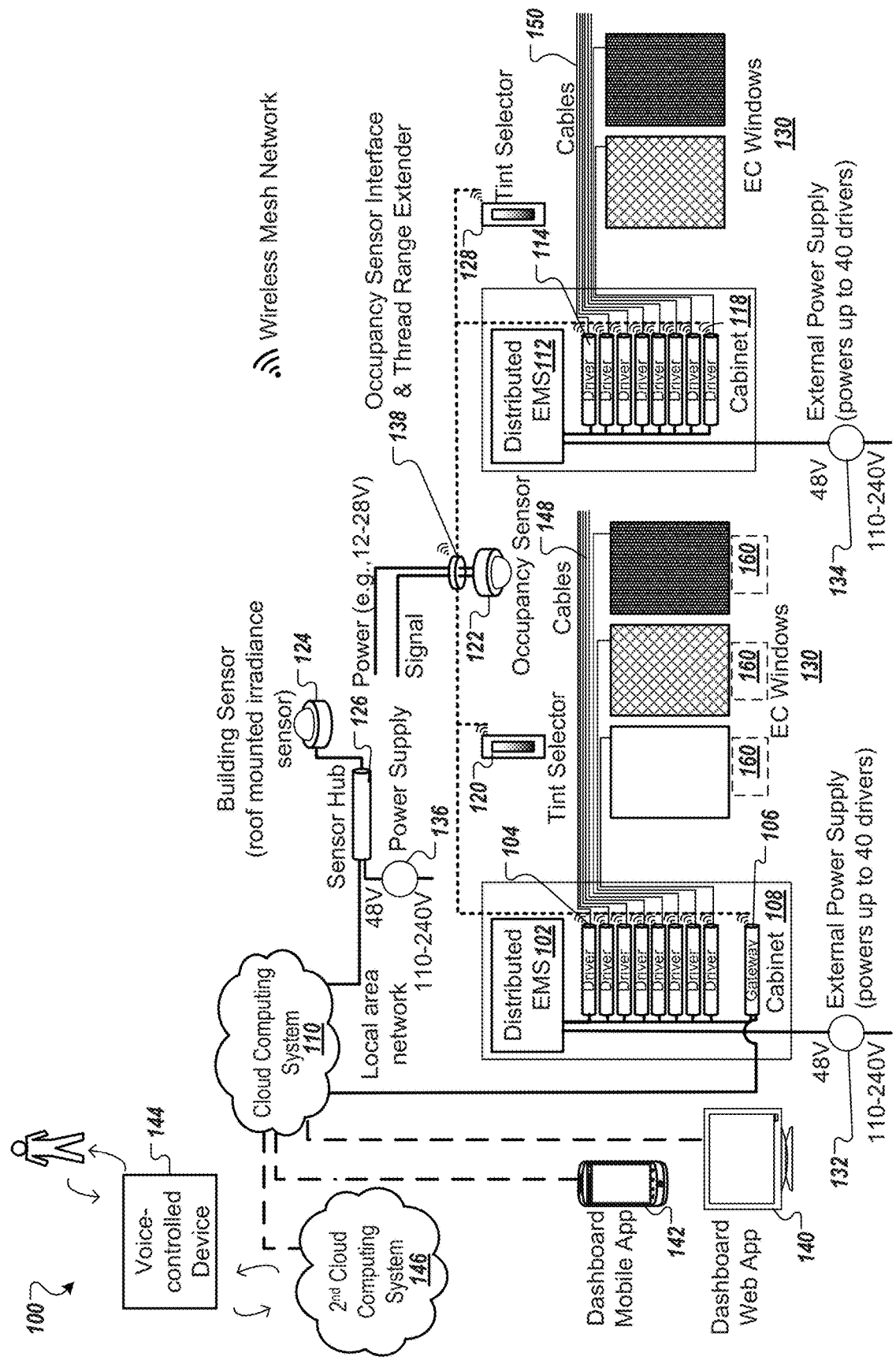
FIG. 1 is a block diagram of an electrochromic window system, according to certain embodiments.

Cloud-based component linking in a smart window system is described. Electrochromic devices can be, for example, used for smart windows in a commercial or residential building. A smart window refers to one or more glass units whose characteristics (e.g., a tint level representing a particular transmissivity parameter, reflective glare, etc.) can be changed automatically (e.g., at a particular time, in response to a weather condition, etc.). A modern multi-story building can include thousands of external and internal windows. As such, controlling electrochromic devices in an efficient manner becomes increasingly important.

Conventional systems typically use local computers to control electrochromic devices via one or more local networks. However, the use of local computers has several deficiencies. Firstly, for each electrochromic device, the local computer may transmit instructions to a corresponding driver and the driver may control the electrochromic device. A user may manually update the local computer based on the amount, type, and configuration of drivers and the electrochromic devices. The manual updates from the user may include errors. The local computer may not provide a graphical representation of the components (e.g., drivers, electrochromic devices, etc.) of the smart window system. To replace a component (e.g., a driver) of the smart window system, a user may initiate the previous component, download the configurations of the previous component, initiate the new component, upload the configurations to the new component from the previous component, and manually update the local computer based on the new component. If the previous component is unable to initiate (e.g., if a driver that is to be replaced cannot turn on), the user may not be able to configure the new component based on the previous component.

Aspects of the present disclosure address the deficiencies of conventional systems by providing cloud-based component linking in a smart window system. A processing device of a cloud computing system may identify components of the smart window system. The components may include electrochromic devices, drivers, and one or more gateways. Each of the drivers may control a corresponding electrochromic device. Each of the drivers may receive instructions from a server device via a corresponding gateway. The processing device may determine physical linking (e.g., physical linking of each electrochromic device to a corresponding driver), network linking (e.g., network linking of each driver to a corresponding gateway), and application linking (e.g., application linking of one or more subsets of the electrochromic devices). The processing device may display, via a graphical user interface (GUI), a graphical representation of the components of the smart window system, the physical linking, the network linking, and the application linking. The processing device may determine a first component to be replaced by a new component, cause the new component to be configured based on configurations of the first component, and update the GUI based on the new component.

In some embodiments, the processing device receives an electronic model (e.g., computer aided drafting (CAD) file) of a building and the processing device identifies the components of the smart window system based on the electronic model of the building. In some embodiments, the processing device determines the physical linking based on the electric model of the building.

In some embodiments, responsive to user input via the GUI, the processing device configures the application linking of one or more of the electrochromic devices. For example, the user input (e.g., that causes the application linking) may indicate that two or more electrochromic devices are to be in the same group (e.g., the electrochromic devices are to each be set at the same tint level responsive to user input) or the same scene (e.g., a first subset of the electrochromic devices is to be set at a first tint level and a second subset of the electrochromic devices is to be set at a second tint level based on user input). The electrochromic devices in the same application linking may be controlled together. In some embodiments, the electrochromic devices in the same group (e.g., specified by the application linking) are to change tint level at the same time (e.g., simultaneously, concurrently) and/or at the same rate. In some embodiments, a first subset of electrochromic devices (and/or a second subset of electrochromic devices) in the same scene (e.g., specified by the application linking) are to change tint level at the same time (e.g., simultaneously, concurrently) and/or at the same rate (e.g., the first subset at a first rate and the second subset at a second rate).

In some embodiments, the processing device is to perform troubleshooting of one or more of the physical linking, network linking, or application linking responsive to user input via the GUI. For example, the processing device may indicate that the amount of drivers linked to a gateway have exceeded a threshold amount of drivers.

In some embodiments, the processing device may display a corresponding current state of each of the components of the smart window system via the GUI. For example, the processing device may display one or more of: which of the electrochromic devices is changing tint level, which of the drivers is being updated, which of the components of the smart window system is online, the corresponding mode of each of the electrochromic devices (e.g., glare control mode, manual mode, energy saving mode, etc.), etc.

Aspects of the present disclosure result in technological advantages of significant reduction in energy consumption (e.g., battery consumption), required bandwidth, processor overhead, and so forth. In some embodiments, the technological advantages result from displaying a graphical representation of each of the components of the smart window system, the physical linking, the network linking, and the application linking instead of the user determining the components and physical linking by physical inspection of the installation, manual adjustment of the tint levels, sending multiple inquiries and receiving multiple responses, etc. In some embodiments, the technological advantages result from determining the components and the physical linking based on an electronic model of the building instead of being based on manual user input of each of the components and each corresponding physical linking. The manual user input may be prone to user error where the processing device would detect user error, receive re-inputted information, and re-verifying for error, whereas using an electronic model may avoid the error and corresponding processor overhead. In some embodiments, the technological advantages result from configuring linking (e.g., application linking of electrochromic devices) via the GUI and troubleshooting the linking instead of allowing the system to run with errors and malfunction. In some embodiments, the technological advantages result from displaying the current state of each of the components via the GUI instead of a user performing visual inspection of the components (e.g., to determine tint level of the electrochromic devices) and sorting through data received from the components to determine current state.

FIG. 1 is a block diagram of an electrochromic window system 100 (e.g., smart window system) that performs cloud-based component linking, according to one embodiment. The electrochromic window system 100 includes a first cabinet 108 in which a first distributed energy management system (EMS) 102, a first set of drivers 104, and a gateway 106 are located. In an alternate embodiment the drivers 104 may be integrated drivers where one or more drivers are integrated into the EC windows. Each of the set of drivers 104 is coupled to an individual one of a set of electrochromic (EC) windows 130. Alternatively, other electrochromic devices can be driven by the set of drivers 104. The set of drivers 104 are coupled to the set of EC windows 130 via power cables 148 and control wires. The cabinet 108 can be a standard size, such as 28", 42", or 60". The cabinet 108 can be located in proximity to the EC windows 130 or located away from the EC windows 130, such as up to 300 feet. The cabinet 108 can be located in a location that reduces wiring costs. Between each driver and EC window there may be one or more power cables 148 coupled to an anode of the EC window and one or more power cables 148 coupled to a cathode of the EC window. There may be two control wires for sensing the voltage of the EC window (referred to herein as sense voltage or Vsense) and two wires for sequestration operations, as described herein. In one embodiment, each driver of the set of drivers 104 can supply up to 8 amps to each EC window of the set of EC windows 130. An external power supply 132 is coupled to provide external power to the distributed EMS 102, the set of drivers 104, and the gateway 106 within the first cabinet 108. For example, 16 AWG 2 conductor plenum cables can provide lower voltage (48V) or higher voltage (110-240V) to the first cabinet 108. The external power supply 132 can be located in proximity to the first cabinet 108 or farther away from the first cabinet 108, such as up to up to hundreds of feet or up to 1000 feet. In some embodiments, the external power supply 132 is configured to supply less than 25% of a maximum power used by the set of EC windows 130 during switching of one or more of the set of EC windows 130. Additional external power supplies can be used to power the components in the first cabinet 108. The external power supply 132 may be a conventional power supply connected to the power grid or it may be a building battery such as the residential batteries built by Tesla (the Powerwall battery) or LG Chem's RESU battery that obtain energy from a source such as on-site solar energy cells. The external power supply 132 may be a combination of the power grid and a building battery.

Although portions of the present disclosure describe the electrochromic window system 100 in relation to a distributed EMS, the electrochromic window system 100 may include one or more different types of power sources (e.g., a battery, a local power source inside of a driver, a multi-device boost power supply, etc.) in addition to or instead of the distributed EMS.

In some embodiments, a driver for an EC window may be integrated into the EC window itself in either the frame of the window, in the integrated glass unit (IGU) of the EC window, or in the laminated glass unit (LGU) of the EC window.

Each EC window may include an electrochromic panel (e.g., glass or film) that can change transmissivity with the application of electric current and voltage. The change of transmissivity typically relies on a reversible oxidation of a material. Electrochromic units can darken at the press of a button (e.g., user input via tint selector 120 or 128, dashboard web app 140, dashboard mobile app 142, etc.) or in response to an automatic triggering event and are also often used in automobile rearview mirrors to reduce reflective glare. In some embodiments, upon receiving user input via the tint selector 120 to tint a first EC window associated with a first driver, the tint selector 120 may transmit instructions to the first driver and the first driver may control the tint level of the EC window. In some embodiments, upon receiving user input via a user device to tint a first EC window associated with a first driver, dashboard web app 140 or dashboard mobile app 142 (e.g., executing on the user device) may transmit the user input to the cloud computing system 110, the cloud computing system 110 may transmit the user input to the gateway 106, and the gateway 106 may transmit the user input to the first driver to cause the first driver to control the tint level of the first EC window. The different transmissivities of the EC windows may be referred to as tint levels (e.g., 0% tint level is 65% transmissivity, 50% tint level is 21% transmissivity, 100% tint level is 2% transmissivity, etc.).

In some embodiments, one or more power sources (e.g., the distributed EMS, a battery, a local power source inside of a driver, a multi-device boost power supply, etc.) may provide additional power (e.g., boost power) to an electrochromic device (e.g., EC window 130) that can be supplied by a main power supply. The one or more power sources may support a varied number of EC windows based on geometry and size of the EC windows, how often the EC windows are tinted, as well as how low other power sources (e.g., the batteries of the distributed EMS 102) can be discharged.

Each power source (e.g., distributed EMS 102) may supply power to the set of drivers 104 according to a power state of the set of EC window 130, as well as the power state of other power sources (e.g., multi-device boost power supply 208). For example, the distributed EMS 102 can supply a first amount of power to the set of drivers 104 from an external power supply interface in an idle state of the set of EC windows 130. Alternatively, the distributed EMS 102 does not supply power to the set of EC windows 130 in the idle state. In some embodiments the idle power level of an EC window may be zero, for example when the type of EC device used only requires power to switch from one optical transmission state to another optical transmission state. The power state information (e.g., idle state, tinted state, transitioning between states, etc.) may be provided to the gateway 106 and may be shared with the cloud computing system 110.

The additional power provided by the one or more power sources can enable fast and uniform switching in a variety of conditions, and in particular when the EC window 130 includes a gradient conductive layer.

An EC window 130 including a gradient transparent conductive layer can have very fast switching speed (e.g., less than 5 minutes, or less than 10 minutes) as well as uniform transitions between states (e.g., where the clear state, dark state and all tinted states have delta E across the area of the panel less than 10) by including one or more gradient transparent conductive layers in each EC device or panel. The term "gradient transparent conductive layer" refers to an electrically conducting layer with spatially varying sheet resistance, or resistance to current flow substantially parallel to a major surface of the layer, that varies as a function of position within the electrically conductive layer. The gradient transparent conductive layer or layers also enable the driving of an EC window 130 incorporating such a layer at much higher voltages so that high amounts of power are required initially to drive fast switching. The gradient transparent conductive layer may be a patterned or graded transparent conductive oxide (TCO) such as indium titanium oxide and tantalum tin oxide. In other embodiments, the distributed EMS 102 can be used in connection with drivers that drive other types of EC windows 130. Additionally, the distributed EMS can be used to drive multi-panel electrochromic windows that include more than one EC window 130 connected in series or parallel. A multi-panel electrochromic window may be one where the EC windows 130 are stacked over one another to provide very low transmissivity of light through the devices, for example less than 1% transmissivity of light or less than 0.1% transmissivity of light. Alternatively the multi-panel electrochromic windows may be "tiled" adjacent to one another such that more than one EC window 130 is laminated to a carrier glass substrate to form larger sized windows. In another embodiment a single driver may be used to drive multiple electrochromic windows that may be in a group of electrochromic windows. For example a single driver may drive two or more electrochromic windows.

The gateway 106 is operatively coupled to a cloud computing system 110. A cloud computing system refers to a collection of physical machines (e.g., server devices), that host applications providing one or more services to multiple components (e.g., gateway 106, sensor hub 126, drivers 104, distributed EMS 102, user devices executing dashboard mobile app 142 or dashboard web app 140, etc.) via a network. In some implementations, the applications hosted by cloud computing system 110 may provide services (e.g., scheduling, viewing, remote management, glare control, etc.) to users accessing the cloud computing system 110 via a network. The applications may allow users to manipulate (e.g., access, create, edit, store, delete, share, collaborate, print, etc.) electronic documents (e.g., schedules, rules, configurations, glare control, etc.). The cloud computing system 110 may include one or more server devices and one or more data stores. The cloud computing system 110 may include cloud-based component linking module 224 (e.g., see FIG. 2). The cloud-based component linking module 224 may include one or more applications, one or more server devices, etc. The cloud computing system 110 may include a cloud-based component linking module 224 (see FIG. 2). The gateway 106 can be hardwired (e.g., via Ethernet) to a network device of a local area network, to gain access to a private or public network to access the cloud computing system 110. The gateway 106 can communicate with the cloud computing system 110 over Cat 5 wiring using the TCP/IP protocol with TLS (SSL) for secure communications. The gateway 106 can communicate with the cloud computing system 110 using secure communications, such as using IPV4, IPv6, or Transport Layer Security (TLS) networking protocols. The cloud computing system 110 can provide control logic, glare control (e.g., cause tint level of the EC windows 130 to be set to avoid glare), and configuration for the electrochromic window system 100. The cloud computing system 110 may receive information (e.g., via one or more application programming interfaces (APIs), weather information, etc.) for providing glare control, etc. The cloud computing system 110 may determine which EC windows 130 each device (e.g., tint selector 120 or 128, gateway 106, etc.) and each application (e.g., dashboard mobile app 142, dashboard web app 140, etc.) is authorized to view and/or control and the priority of control. For example, the cloud computing system 110 may determine that the tint selector 120 is authorized to control EC windows 130 that are connected to drivers 104. In another example, the cloud computing system 110 may determine that the dashboard mobile app 142 logged in by a first user is authorized to view and control only the first window of the EC windows 130. During configuration (e.g., commissioning, set-up by an administrator), the cloud computing system 110 may receive instructions of which users and which devices are authorized to control which EC windows 130. In some embodiments, the cloud computing system 110 may authorize access by components (e.g., tint selectors 120 and 128, gateway 106, etc.) to a wireless mesh network (e.g., during commissioning or set-up) and once authorized, subsequent access of the wireless mesh network is not dependent on further authorization (e.g., components are authorized during commissioning or set-up and do not need further authorization to continue accessing).

In some embodiments, the cloud computing system 110 may use machine learning to provide control of the EC windows 130. In some embodiments, the cloud computing system 110 may include a broker module to receive data from the gateway 106, sensor hub 126, etc. (e.g., for providing glare control, for providing data visibility) and to transmit data to other gateways 106. In some embodiments, control of the EC windows 130 may be distributed over the cloud computing system 110 and the gateway 106. For example, the cloud computing system 110 may provide settings files (e.g., a schedule, rules, etc.) to the gateway 106 and the gateway 106 may control the EC windows 130 based on the settings files. The cloud computing system 110 may send additional instructions to the gateway 106 to deviate from the settings files in controlling the EC windows 130 (e.g., responsive to the cloud computing system 110 receiving user input via a dashboard mobile app 142, sensor data via the sensor hub 126, the gateway 106 may provide a conduit for control of the EC windows 130, etc.)

The cloud computing system 110 can provide automation algorithms, data analytics, user management, security protocols, and the like. The cloud computing system 110 can provide extensive system health monitoring and proactive troubleshooting, as well as provide third-party integration without complicated on-site technical support. The cloud computing system 110 can provide a system dashboard to a dashboard web app 140 on a desktop computer, a dashboard mobile app 142 on a personal computing device, or both. The dashboard web app 140 and the dashboard mobile app 142 can be used to monitor or control the electrochromic window system 100. The dashboard web app 140 and the dashboard mobile app 142 are applications that may be executed on one or more user devices. For example, the dashboard mobile app 142 may execute on a mobile user device, such as a smart phone or a tablet. The dashboard web app 140 may execute on a desktop, laptop, etc. The dashboard web app 140 or the dashboard mobile app 142 (executing on a user device) may receive user input (e.g., selection of one or more EC windows and a tint level) via the user device and may transmit the user input to the cloud computing system 110. Responsive to determining that the user input is a request to view information (e.g., monitor current status of components, current mode of EC windows 130, etc.), the cloud computing system 110 may retrieve the information and transmit the information to the user device to cause the dashboard web app 140 or dashboard mobile app 142 to display the requested information. Responsive to determining that the user input is a request to change operation of one or more components of the electrochromic window system 100, such as a request to tint a first EC window associated with a first driver, the cloud computing system 110 may transmit the user input to the gateway 106, the gateway 106 may transmit the user input to the first driver, and the first driver may control the tint level of the first EC window based on the user input.

The cloud computing system 110 can also interact with other devices or networks, such as with a second cloud computing system 146, as illustrated in FIG. 1, that communicates with a voice-controlled device 144. For example, the voice-controlled device 144 may receive audible commands from a user to control or get a report of the electrochromic window system 100. The dashboard web app 140 and the dashboard mobile app 142 can communicate with the cloud computing system 110 using the TCP/IP protocol with TLS (SSL) and using encryption and authentication for secure communications. The cloud computing system 110 can include a microservice architecture that is exposed through APIs to manage interaction with onsite components, such as the gateways, drivers, and tint selectors. The cloud computing system 110 can eliminate complicated onsite networking requirements, as the external control occurs through the APIs. The cloud computing system 110 can provide centralized data aggregation from all deployments to facilitate automation and analytics. The centralized data aggregation of the cloud computing system 110 may also include data from the manufacturing, testing, and assembly of the EC Windows 130 and any associated hardware of the electrochromic window system 100 (e.g. drivers 104, gateways 106, etc.). The cloud computing system 110 can leverage various authentication and authorization technologies to secure site access. The cloud computing system provides a robust platform that facilitates on-demand load scaling and health monitoring. The cloud computing system 110 can also provide a better path for onsite workload migration, backed by a robust central cloud store.

As described above, the gateway 106 communicates directly with the cloud computing system 110 through secured channel(s). The gateway 106 communicates with the cloud computing system 110 on behalf of the set of drivers 104 and the distributed EMS 102. The gateway 106, the set of drivers 104, and the distributed EMS 102 communicate with each other over wireless connections, such as over a secure thread wireless network. For example, each of these components can communicate using IEEE 802.15.4, 2.4 GHz, IPv6 mesh network routing (thread). These communications can be encrypted with 128-bit AES encryption. Alternatively, other mesh networks can be used, as well as other frequencies, and encryption techniques.

It should be noted that, after the drivers and the distributed EMS are configured via the gateway, the distributed EMS and driver behavior is not dependent on the gateway for safe operation. That is, the gateway can be disconnected and the drivers will not drain the batteries of the distributed EMS.

As illustrated in FIG. 1, the electrochromic window system 100 may include additional devices, such as a tint selector 120, an occupancy sensor 122, an occupancy sensor interface and thread range extender 138, a building sensor 124 (e.g., roof mounted irradiance sensor), and a sensor hub 126.

The sensor hub 126 can be powered by an external power supply 136 and can be hardwired to the local area network, much like the gateway 106.

The occupancy sensor interface, thread range extender 138, and occupancy sensor 122 can be powered by an external power supply and can send or receive signals to or from a lighting system or a building management system (BMS). The tint selector 120 and occupancy sensor interface and thread range extender 138 can communicate with other devices on the wireless mesh network.

The tint selector 120 can be a device that is mounted on a wall where a user can activate a transition of one or more EC windows 130. The tint selector 120 can be mounted or otherwise disposed in a building having the EC windows 130 to permit user control of one or more EC windows 130 (e.g., the set of EC windows). The tint selector 120 can be programmed to be part of group of EC windows (e.g., a set of windows that are to be set at the same tint level, e.g., all EC windows in the group tinted 50%). That is the tint selector 120 can be associated with the set of drivers 104 and the gateway 106. Alternatively, the tint selector 120 can be associated with a scene of one or more EC windows. Upon receiving user input (e.g., via the tint selector 120) for EC windows to be tinted in a scene, one or more first EC windows of the scene are to be tinted at a first tint level and one or more second EC windows of the scene are to be tinted at a second tint level (e.g., all EC windows of the scene are to be tinted 100% except for one EC window of the scene that is to be tinted 50%). Upon receiving user input, the tint selector may transmit (e.g., multicast) a signal to the corresponding drivers to cause the EC windows to change tint level. The tint selector may also transmit the user input to the gateway 106 to cause the gateway to transmit the user input to the cloud computing system 110.

The electrochromic window system 100 can include one or more additional tint selectors, such as illustrated in FIG. 1 by a second tint selector 128 that is also wirelessly coupled to the wireless mesh network. The second tint selector 128 can be associated with the same group or scene as the tint selector 120. Alternatively, the second tint selector 128 can be associated with a different group or a different scene as the tint selector 120.

In a further embodiment, the electrochromic window system 100 can include one or more cabinets, such as illustrated in FIG. 1 with a second cabinet 118. The second cabinet 118 can include a second distributed EMS 112 and a second set of drivers 114. In some cases, the second cabinet 118 does not include a second gateway and the gateway 106 manages the second set of drivers 114 as well. An external power supply 134 is coupled to provide external power to the second distributed EMS 112 and the second set of drivers 114 within the second cabinet 118. For example, 16 AWG 2 conductor plenum cables can provide lower voltage (48V) or higher voltage (110-240V) to the second cabinet 118. The external power supply 134 can be located in proximity to the second cabinet 118 or farther away from the second cabinet 118, such as up to 350 feet. In other cases, more than two cabinets may be used. It should also be noted that additional external power supplies can be used to power the components in the cabinet 108 and the second cabinet 118.

Each component of the electrochromic window system 100 can be designed to automatically obtain critical operating data from the cloud computing system 110 to avoid a single failure requiring significant maintenance downtime. Although various components are illustrated in FIG. 1, in other embodiments, the electrochromic window system 100 may include more or less components than as illustrated in FIG. 1.

In another embodiment, the electrochromic window system 100 includes drivers 160 located at each of the set of EC windows 130, instead of or in addition to the set of drivers 104 in the first cabinet 108. In some cases, each EC window 130 has a driver 160, as illustrated. In other cases, a single driver 160 can drive multiple EC windows 130. The drivers 160 can be coupled to an external power supply. The external power supply can be located at the EC window 130 or in close proximity. In this case, the external power supplies for the set of EC windows 130 can be considered to be distributed, instead of centralized as described above. In other cases, the drivers 160 do not use an external power supply.

It should be noted that various embodiments described herein are described with respect to a commercial installation. In other embodiments, the electrochromic window system 100 can be deployed in a residential installation. In those cases, there may be modifications to the electrochromic window system 100 as described above to accommodate differences between the commercial installation and the residential installation.

In some embodiments (e.g., residential installations), one or more of the components of the electrochromic window system 100 may be combined. For example, one piece of hardware may include a gateway and two or more electrochromic windows (e.g., hardware that includes a gateway and one or more drivers). In some embodiments (e.g., residential installations), the gateway may transmit data less frequently and/or transmit less data. In some examples, the gateway transmits data at a predetermined point in time (e.g., without transmitting a subset of the data stream immediately). In some examples, the gateway discards a subset of the data stream (e.g., does not store the subset in the file (data file) to be transmitted to the server device. In some examples, the gateway stores the data stream or a subset of the data stream locally (e.g., instead of transmitting the data stream to the server device). In some embodiments, the gateway transmits a subset of the data stream to the server device responsive to a request (e.g., specifying particular types of events, errors, malfunctions, etc.) from the server device (e.g., otherwise the gateway stores and/or discards data). In some embodiments, the gateway dynamically configures what data is transmitted (e.g., based on bandwidth, storage, cost, etc.). In some embodiments, the gateway transmits and/or stores the data that changes (e.g., changes over time, varies from a schedule, that is not redundant, changes from last state of interest, reportable change, anomalous behavior, manually overriding a tinting schedule, etc.).

In some embodiments, one or more of a corresponding tint selector 120, driver 104, one or more EC windows 130, occupancy sensor, etc. are located in each unit (e.g., townhome, apartment, portion of prefabricated building, portion of modular building) and a common gateway 106 is located in a central location (e.g., hallway, mechanical room, etc.). Thread range extenders may be used for the common gateway 106 to communicate with the other components. A user may have access to a user account and a tint selector that only control EC windows 130 corresponding to the unit to which the user has access.

In some embodiments, one or more components (e.g., gateway 106, sensor hub 126, etc.) of the electrochromic window system 100 may have two or more network connections. In some examples, two or more wired network connections (e.g., each corresponding to a different network) may be routed to the same component. In some examples, a wired network connection and a wireless network connection (e.g., each corresponding to a different network) may be provided to the same component. In some examples, two or more wireless network connections (e.g., each corresponding to a different network) may be provided to the same component. A first network may be a primary network (e.g., cable network, Ethernet network, etc.) and a second network may be a cell modem backup network (e.g., integrated cellular modular in the cabinet). The cabinet 108 may have a router for receiving the different network connections. The one or more networks to which components of the electrochromic window system 100 are connected may be separate from other building networks.

In some embodiments, one or more components (e.g., gateway 106, sensor hub 126, etc.) of the electrochromic window system 100 transmit and receive data via the network that is functioning (e.g., if the primary network is down, the cell modem backup network is used). In some embodiments, one network (e.g., cable network) has a lower price than a backup network (e.g., cell modem backup network). The components of the electrochromic window system 100 may send higher priority data via whichever network is functioning and may wait until the lower-price network is functioning to transmit lower priority data. In some embodiments, one or more components (e.g., gateway 106, sensor hub 126, etc.) of the electrochromic window system 100 are aware of which network connection is functioning. In some embodiments, one or more components (e.g., gateway 106, sensor hub 126, etc.) of the electrochromic window system 100 transmit a message to the cloud computing system 110 (e.g., requesting via which network the cloud computing system 110 is receiving the message) and the cloud computing system 110 may provide a response indicating via which network (e.g., hardwired network or cellular network) the message was received. The component of the electrochromic window system 100 may determine which network is functioning based on the response.

In some embodiments, one or more components of the electrochromic window system 100 use wireless power (e.g., wireless power transfer (WPT), non-wired power). The wireless transfer of power may be via induction (e.g., electromagnetic induction, inductive coupling of magnetic fields, non-radiative induction), resonance (e.g., radiative electromagnetic resonance, resonance induction), radio frequency (RF) power transfer (e.g., uncoupled RF wireless power transfer), microwave power transfer, and/or laser power transfer. For example, a driver may wirelessly transmit power to an EC window 130.

In some embodiments, one or more of the EC windows 130 are photovoltaic (PV) windows (e.g., PV EC windows) that include a PV coating coupled to a battery. The PV coating may collect energy from the sun and charge the battery. The battery, wireless power, and/or an external power supply (e.g., via one or more drivers, via distributed EMS, etc.) may be used to tint the EC window (e.g., the battery may be used first and then one or more drivers may be used as a backup power supply).

Figure 2:
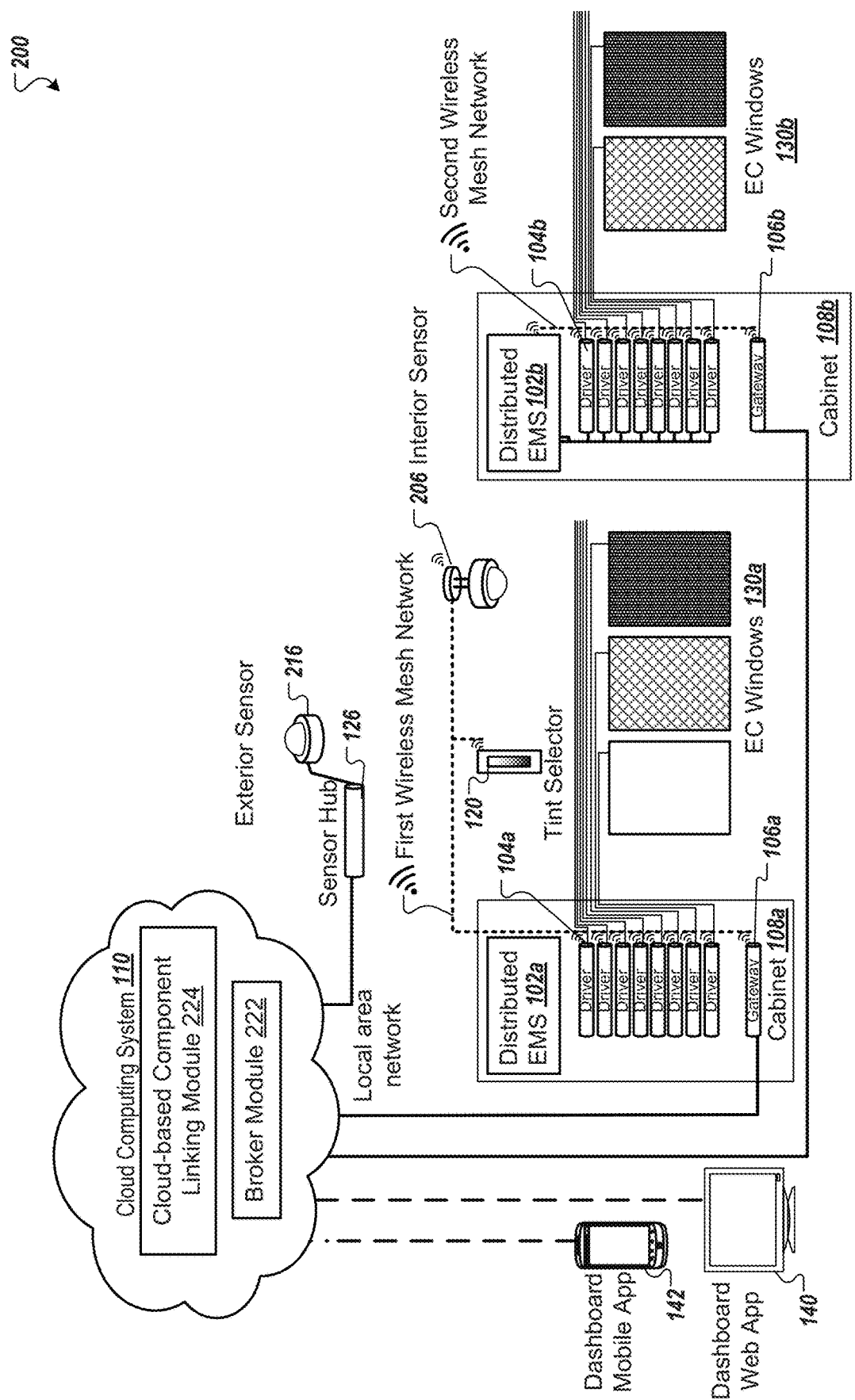
FIG. 2 is a block diagram of an electrochromic window system including a cloud-based component linking module, according to certain embodiments.

FIG. 2 is a block diagram of an electrochromic window system 200 (e.g., smart window system) including a cloud-based component linking module 224 and a broker module 222, according to certain embodiments. Components with the same reference number as those in FIG. 1 may include similar or the same functionalities as those described in relation to FIG. 1. One or more modules, functionalities, data stores, etc. of cloud computing system 110 may be provided by a third party service. In some embodiments, the broker module 222 may be provided by a third party (e.g., a third party on-demand cloud computing platform provider). In some embodiments, the broker module 222 is provided by the same entity that provides the cloud-based component linking module 224. In some embodiments, the cloud-based component linking module 224 is a single module that operates on the cloud computing system 110. In some embodiments, the cloud-based component linking module 224 includes two or more modules (e.g., two or more microservices). For example, the cloud-based component linking module 224 (e.g., logic, schedules, trained machine learning model, a retrained machine learning model, etc.) may be deployed at the gateway 106. Components of the electrochromic window system 200 may have a wired and/or wireless connection to one or more other components of the electrochromic window system 200. For example, the gateway may have a wired and/or wireless connection to one or more of the distributed EMS 102, one or more drivers 104, sensor hub 126, exterior sensor 216, interior sensor 206, tint selector 120, and/or one or more EC windows 130. Each of the components of the electrochromic window system 200 may have one or more wireless interfaces, one or more wired interfaces, or any combination thereof. For example, one or more components of the electrochromic window system 200 may include one or more radios, one or more wired transceivers (e.g., Universal Asynchronous Receiver/Transmitter (UART), power line communication (PLC) transceiver), or the like. One or more components (e.g., drivers 104, the gateway 106, the tint selector 120, or the like) of the electrochromic window system 200 may communicate over one or more wired connections or even over power lines.

One or more modules, functionalities, data stores, etc. of cloud computing system 110 may be provided by a third party service. In some embodiments, the broker module 222 may be provided by a third party (e.g., a third party on-demand cloud computing platform provider). In some embodiments, the broker module 222 is provided by the same entity that provides the cloud computing module 224. In some embodiments, the cloud-based component linking module 224 is a single module that operates on the cloud computing system 110. In some embodiments, the cloud-based component linking module 224 includes two or more modules (e.g., two or more microservices, two or more applications). In some embodiments, the cloud-based component linking module 224 may include one or more applications and one or more servers.

The electrochromic window system 200 may include the cloud computing system 110 and components including one or more of drivers 104, one or more gateways 106, EC windows 130 (e.g., PV EC windows, battery coupled to PV coating, etc.), distributed EMS 102, tint selector 120, interior sensors 206, sensor hub 126, exterior sensors 216, components associated with wireless power transfer, etc. The cloud computing system 110 may include the cloud-based component linking module 224 and the broker module 222. The cloud-based component linking module 224 may identify the components of the electrochromic window system 200 (e.g., via broker module 222).

The cloud computing system 110 is coupled to one or more gateways 106, a sensor hub 126, a dashboard web app 140, and a dashboard mobile app 142. Each gateway 106 may be coupled via a corresponding wireless mesh network to drivers 104, interior sensors 206 (e.g., occupancy sensor 122, occupancy sensor interface and thread range extender 138, etc.), one or more tint selectors 120, and the distributed EMS 102. The gateway 106 may include characteristics of one or more of a hub, proxy, or aggregator. A sensor hub 126 may be coupled to one or more exterior sensors 216. The drivers 104, distributed EMS 102, tint selector 120, and interior sensors 206 may be disposed proximate the gateway 106 (e.g., within the building, within range of the wireless mesh network, etc.). The interior sensors 206 may include one or more of interior light sensors, a sensor on a window to collect EC window 130 transmittance data, sensors to collect photographic data from interior of building, occupancy sensors, etc. The exterior sensors 216 may be disposed proximate sensor hub 126 (e.g., proximate the roof of the building, on the roof, proximate the edge of the roof, etc.). The exterior sensors 216 may include one or more of light sensors on the sides of buildings, temperature and/or humidity sensors, sensors (or cameras) to collect photographic data of cloud cover (or irradiance), irradiance sensor, rooftop pyranometer sensor (e.g., measure total global irradiance, measure diffuse horizontal irradiance (shadowed light, diffuse horizontal irradiance (DHI)), calculate direct normal irradiance, include non-visible spectrum), etc. DHI may refer to the terrestrial irradiance received by a surface (e.g., horizontal surface) which has been scattered or diffused by the atmosphere. DHI may be a component of global horizontal irradiance which may not come from the beam of the sun (e.g., beam may be about a 5-degree field of view concentric around the sun).

In some embodiments, a sensor (e.g., interior sensor 206, exterior sensor 216) transmits sensor data to the gateway 106. For example, one or more exterior sensors 216 (e.g., camera, temperature sensor, illuminance sensor, humidity sensor, pressure sensor, rain sensor, or the like) may be mounted on the roof and may transmit data (e.g., sensor data, images, etc.) to the gateway 106. In some embodiments, an exterior sensor 216 is coupled (e.g., wirelessly, wired, etc.) with the gateway 106 (e.g., without use of a sensor hub 126). In some embodiments, an exterior sensor 216 communicates with cloud computing system 110 (e.g., without use of a sensor hub 126, without use of gateway 106). In some embodiments, a sensor (e.g., interior sensor 206, exterior sensor 216) has a wireless module to be able to communicate with the cloud computing system 110 and/or other components (e.g., sensor hub 126, gateway 106, etc.). In some embodiments, one or more exterior sensors 216 and a sensor hub 126 may be integrated into a single component that has the functionalities of exterior sensors 216 and the sensor hub 126.

Each gateway 106 may be coupled, via a corresponding wireless mesh network, to corresponding drivers 104 that control corresponding EC windows 130. For example, gateway 106*a* may be coupled, via a first wireless mesh network, to drivers 104*a* that control EC windows 130*a* and gateway 106*b* may be coupled, via a second wireless mesh network, to drivers 104*b* that control EC windows 130*b* (e.g., the EC windows 130 span more than one wireless mesh network). The drivers 104*a* may be coupled to a gateway 106*a* and drivers 104*b* to gateway 106*b* because of capacities (e.g., capacity of each gateway 106, cabinet 108, distributed EMS 102, wireless mesh network, etc.), length of cables, etc.

The cloud-based component linking module 224 may determine physical linking, network linking, and application linking of two or more of the components of the of the electrochromic window system 200.

Two or more components of the electrochromic window system 200 may be physically linked (e.g., have a corresponding physical linking). Each driver 104 may be physically linked to a corresponding EC window 130. Each distributed EMS 102 may be physically linked to one or more of a driver(s) 104 or a gateway 106. Exterior sensors 216 may be physically linked to a sensor hub 126 and/or to the gateway 106.

Two or more components of the electrochromic window system 200 may be linked via a network (e.g., have a network linking). Interior sensors 206, tint selector 120, distributed EMS 102, drivers 104*a*, and gateway 106*a* may be linked via a first wireless mesh network. Distributed EMS 102*b*, drivers 104*b*, and gateway 106*b* may be linked via a second wireless mesh network. In some embodiments, one or more exterior sensors 216 are linked to one or more gateways 106 via one or more wireless mesh networks (e.g., via one or more range extenders). Components associated with wireless power transfer may be linked via a network with other components (e.g., EC windows 130).

Two or more components of the electrochromic window system 200 may have an application linking. An application linking may be associated with a group of EC windows 130. EC windows 130 in a group are to be controlled together (e.g., all EC windows 130 in a group change to the same tint level, all EC windows 130 in a group controlled by the same mode, etc.). For example, EC windows 130*a* may be in a group. Responsive to user selection of a tint level via tint selector 120, each of the EC windows 130*a* changes to the selected tint level.

An application linking may be associated with a scene of EC windows 130. EC windows 130 in a scene include a first subset of the EC windows 130 that are to be set to a first tint level and a second subset of the EC windows that are to be set to a second tint level different from the first tint level (e.g., one EC window is cleared and the rest of the EC windows are tinted, first subset controlled by a first mode and second subset controlled by a second mode, etc.). For example, EC windows 130*b* may be in a scene. Responsive to user selection of the scene (e.g., via tint selector 120, dashboard web app 140, dashboard mobile app 142), a first EC window of EC windows 130*b* may be set to a first tint level and a second EC window of EC windows 130*b* may be set to a second tint level.

The cloud-based component linking module 224 may display (e.g., via a GUI displayed on dashboard web app 140, dashboard mobile app 142, etc.), a graphical representation of the components of the electrochromic window system 200, the physical linking, the network linking, and the application linking. The cloud-based component linking module 224 may determine that a first component of the electrochromic window system 200 is to be replaced by a new component. For example, the cloud-based component linking module 224 may receive (e.g., via the user device executing the dashboard web app 140 or the dashboard mobile app 142) one or more of user input that a previous driver is to be replaced by a new driver, a user-input identifier of one or more of the previous driver or the new driver, or a scanned identifier of one or more of the previous driver or the new driver. The cloud-based component linking module 224 may identify configurations (e.g., one or more configuration files) corresponding to the component that is to be replaced and cause the new component to be configured based on the configurations. For example, the cloud-based component linking module 224 may identify a driver configuration file for the driver that is being replaced and may cause the gateway 106 to configure the new driver based on the configuration file. The cloud-based component linking module 224 may update the GUI based on the new component.

In some embodiments, to identify the components of the electrochromic window system 200, the cloud-based component linking module 224 receives an electronic model of at least a portion of a building (e.g., from the dashboard web app 140, the dashboard mobile app 142) and identifies the components based on the electronic model. The electronic model may be one or more of a two-dimensional floor plan, a three-dimensional floor plan, building information modeling (BIM) software model, a physical (e.g., electrical, power distribution) layout, a networking layout, an application layout, a layout of the electrochromic window system 200, etc. The electronic model may indicate information (e.g., location, type, size, etc.) of one or more of the components of the electrochromic window system 200. The electronic model may indicate linking (e.g., physical linking, network linking, application linking, etc.) of one or more of the components of the electrochromic window system 200. The cloud-based component linking module 224 may process the electronic model to determine one or more of the components in the electrochromic window system 200, the physical linking of the components in the electrochromic window system 200, the network linking of the components in the electrochromic window system 200, or the application linking of the components in the electrochromic window system 200. By using the electronic model to determine one or more of components or linking, the cloud computing system 110 may avoid increased processor overhead, bandwidth, and energy consumption that results from user error (e.g., erroneously input information, processing errors, providing error messages and receiving updated information until there are no errors, etc.). Use of the electronic model to determine one or more components or linking may also save user time over manually modelling the electrochromic window system, troubleshooting, and making changes.

In some embodiments, the cloud-based component linking module 224 receives user input via the GUI indicating a new or changed application linking. For example, the cloud-based component linking module 224 may receive user input via the GUI indicating that EC windows 130*a* and EC windows 130*b* are to be part of the same group or scene. The cloud-based component linking module 224 configures the application linking based on the user input and updates the GUI based on the application linking.

In some embodiments, responsive to receiving user input of one or more of physical linking, network linking, or application linking via the GUI, the cloud-based component linking module 224 performs troubleshooting. The cloud-based component linking module 224 may determine one or more of a design error, an inefficient design, a design not compliant with best practices, etc. For example, the cloud-based component linking module 224 may determine that the amount of drivers physically linked to a distributed EMS 102 exceed a maximum amount of allowed drivers. In another example, the cloud-based component linking module 224 may determine that the amount of drivers linked via a first wireless mesh network to the gateway 106 exceed a maximum amount of allowed drivers. In another example, the cloud-based component linking module 224 may determine that user input was received requesting application linking of components that cannot be in the same group or scene. Responsive to determining the design error or inefficient design, the cloud-based component linking module 224 may perform troubleshooting by providing an alert to the user (e.g., indicating the error, correcting the error, improving the design, providing a suggestion to improve the design, etc.) via the GUI (e.g., displayed on the dashboard web app 140 or dashboard mobile app 142).

In some embodiments, the cloud-based component linking module 224 may determine a current state of each of the components in the electrochromic window system 200. In some embodiments, the broker module 222 receives data via one or more of gateways 106, the sensor hub 126, the dashboard web app 140, or the dashboard mobile app 142. For example, the broker module 222 may receive data, via a gateway 106, from the drivers 104, distributed EMS 102, tint selector, interior sensor 206, etc. In another example, the broker module 222 may receive data, via the sensor hub 126, from one or more exterior sensors 216. The cloud-based component linking module 224 may receive at least a portion of the data received by the broker module 222. In some embodiments, the data received by the broker module 222 is stored in different databases of the cloud computing system 110 (e.g., current and voltage measurements in a corresponding database, current status in a corresponding database, faults in a corresponding database, etc.) and the cloud-based component linking module may retrieve corresponding portions of the data from one or more of the databases. Based on the data retrieved, the cloud-based component linking module 224 may determine a current status of each of the components of the electrochromic window system 200. For example, the cloud-based component linking module 224 may determine a current mode (e.g., energy saving mode, glare control mode, manual mode) of each of the EC windows 130, which components are online (e.g., connected to a corresponding wireless mesh network, connected to the cloud computing system 110, transmitted data within a threshold amount of time to the cloud computing system 110, etc.), the current tint level of EC windows 130, which components are being updated, etc. The cloud-based component linking module 224 may display the current status of each of the components via the GUI. In some embodiments, the cloud-based component linking module 224 may display a list of the components of the electrochromic window system 200 and the current status of each of the components (e.g., a graphical representation of the status next to an identifier of the component, a graphical representation of online or offline, a graphical representation of changing tint level or not changing tint level, a graphical representation of the current mode).

In some embodiments, the broker module 222 receives sensor data (e.g., from exterior sensor 216 via sensor hub 126, from interior sensor 206 via gateway 106*a*) or a signal (e.g., from tint selector 120 via gateway 106*a*, from dashboard web app 140, from dashboard mobile app 142) that is to be used to control EC windows 130 coupled to different gateways 106. In some embodiments, EC windows 130*a* associated with gateway 106*a* and EC windows 130*b* associated with gateway 106*b* may be proximate each other (e.g., located in the same building or in buildings that are proximate to each other). In some embodiments, the broker module 222 transmits the sensor data, signal, or instructions based on one or more of sensor data or the signal to one or more gateways 106. In some embodiments, the cloud-based component linking module 224 may cause the GUI to display an indication of which gateways 106 are using one or more of the sensor hub 126, exterior sensors 216, interior sensors 206, or tint selector 120. For example, the cloud-based component linking module 224 may cause the GUI to indicate that the sensor hub 126 is associated with gateway 106*a* and gateway 106*b* (e.g., sensor data transmitted by the sensor hub 126 to the cloud computing system 110 is used to control the EC windows 130*a* and 130*b*). In another example, the cloud-based component linking module 224 may cause the GUI to indicate that tint selector 120 is associated with (e.g., controls) EC windows 130*a* and 130*b*.

Responsive to cloud computing system 110 receiving a signal (e.g., via broker module 222 from interior sensor 206, tint selector 120, keypad, HVAC system, security system, building management, etc.) that is for controlling multiple components (e.g., causing gateways 106 to send instructions to drivers 104, causing drivers 104 to control EC windows 130, causing tint level of EC windows 130 to change), the cloud computing system 110 may transmit instructions to the gateways 106 (e.g., via the broker module 222 to cause the drivers 104 to control the EC windows 130). The cloud computing system 110 may receive an indication from the gateways 106 that the instructions were completed (e.g., the drivers 104 controlled the EC windows 130 to change to the tint level defined by the instructions). The cloud-based component linking module 224 may update the GUI based on the transmitted instructions and the indication that the instructions were completed (e.g., EC windows 130 were set to a particular tint level based on the glare control mode and based on sensor data from an exterior sensor 216, etc.).

Figure 3:
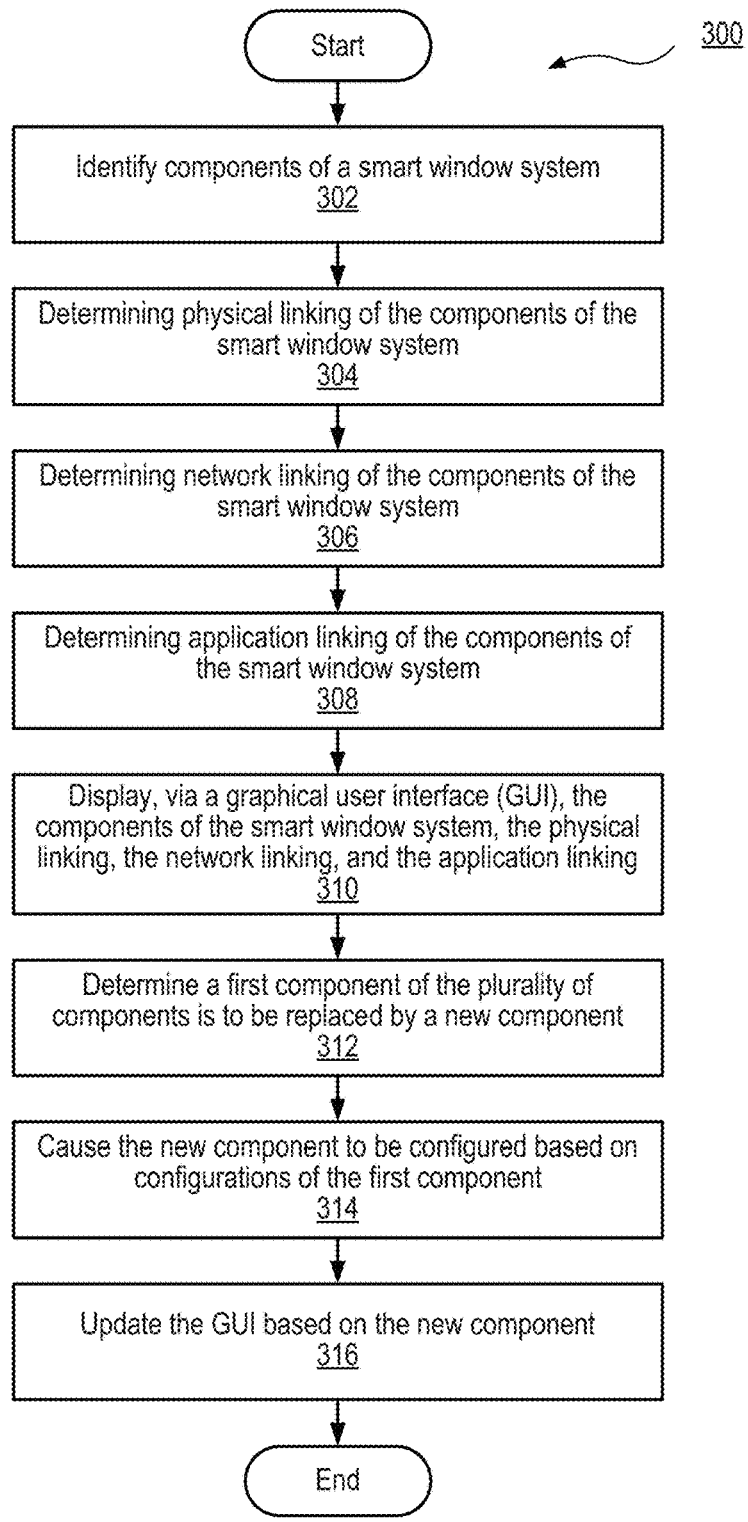
FIG. 3 is a flow diagram of a method of controlling an electrochromic device, according to certain embodiments.

FIG. 3 is a flow diagram of a method of performing cloud-based component linking, according to certain embodiments. The method 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 is performed by the cloud computing system 110 of FIG. 1 or FIG. 2. In another embodiment, the method 300 is performed by a server device of the cloud computing system 110. In some embodiments, the method 300 is performed by a processing device of the cloud computing system 110. In some embodiments, the method 300 is performed by a cloud-based component linking module 224 of the cloud computing system 110. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

Referring to FIG. 3, the method 300 begins at block 302 by the processing logic identifying components of a smart window system. In one embodiment, the processing logic receives an electronic model of at least a portion of a building corresponding to the smart window system (e.g., a floor plan, a three-dimensional model, a BIM software model, etc.). The processing logic may process the electronic model to determine the components of the smart window system. For example, the electronic model may indicate one or more of location, type, or size of one or more of electrochromic devices (e.g., EC windows 130), frames (e.g., that hold EC windows 130), distributed EMS 102, drivers 104, gateways 106, cabinets 108, sensor hub 126, exterior sensors 216, interior sensors 206, tint selector 120, range extenders, etc. In some embodiments, the processing logic may receive an identifier (e.g., during installation or commissioning of a smart window system) of each of the components of the smart window system (e.g., via user input of the identifiers, scanning of an identifier of each of the components, etc.).

At block 304, the processing logic determines physical linking of the components of the smart window system. In some embodiments, the processing logic determines the physical linking based on the electronic model. In some embodiments, the electronic model indicates the location of the components of the smart window system and which components are physically linked (e.g., via a power distribution plan, electrical system of a BIM software model, etc.). In some embodiments, the electronic model indicates one or more of the length or type of physical links between components. The physical linking may include one or more of which components are physically linked, the type of physical link between components, the type of data transmitted via the physical links between the components, etc. In some embodiments, the processing logic receives user input indicating the physical linking of the components. For example, the user input may be via a drop down selection (e.g., for a first driver, user input may indicate that a first EC window of a list of EC windows in a drop down selection is physically linked to the first driver). In another example, the user input may be via the order that components are scanned (e.g., such as scanning a driver 104 and then scanning an EC window 130 to which the driver is physically linked). The components may be scanned by a code or marker on the component or by a photo of the component that can be digitally analyzed to determine the type of component. In another example, the user input may be via augmented reality or virtual reality programs. In some embodiments, the processing logic determines the physical linking based on data received from the components. For example, responsive to receiving via, sensor hub 126, sensor data labeled as originating from a first exterior sensor, the processing logic may determine that the first exterior sensor is physically linked to sensor hub 126.

In some embodiments, the processing logic compares one or more of the physical linking, distance between components that are physically linked, or type of physical links to physical linking capabilities (e.g., maximum amount of components, such as drivers 104 and gateway 106, that can be coupled to the same distributed EMS 102, maximum distance of physical links between components, gauge of physical link between particular components over a particular distance, too many drivers 104 in one cabinet 108, an EC window 130 does not have a corresponding driver 104, a driver 104 is coupled to more than one EC window 130, etc.). The processing logic may provide an alert (e.g., perform troubleshooting) based on one or more of the physical linking, the distance between components that are physically linked, or the type of physical link not having sufficient physical capability. For example, the processing logic may cause the GUI to provide an indication of proposed adjustments to the smart window system (e.g., use a larger cabinet 108, locate the cabinet 108 closer to the EC windows 130, use multiple cabinets 108, etc.). In another example, the processing logic may cause the GUI to provide an indication of the error (e.g., too many components linked to the distributed EMS 102, components are too far from each other, gauge of physical linking not sufficient, too many components in the same cabinet 108, etc.).

At block 306, the processing logic determines network linking of the components of the smart window system. In some embodiments, the processing logic determines the network linking based on the electronic model (e.g., the electronic model includes a network layout). In some embodiments, the electronic model indicates the distance between components (e.g., between the gateway 106 and the one or more of tint selector 120, drivers 104, distributed EMS 102, interior sensors 206, etc.). In some embodiments, the processing logic determines the network linking via user input via the GUI. For example, user input may include scanning the identifier of each component that is part of the same wireless mesh network. In another example, user input (e.g., via a drop down selection or an augmented reality interface) indicates which wireless mesh network with which each component is associated.

In some embodiments, the processing logic compares the one or more of network linking or distance between components to networking capabilities (e.g., maximum amount of components, such as drivers 104, that can be coupled to the same gateway 106, maximum distance between a component and the gateway 106 without a range extender, maximum distance between a component and the gateway 106 with a range extender, etc.). The processing logic may provide an alert (e.g., perform troubleshooting) based on one or more of the network linking or the distance between components exceeding network capabilities. For example, the processing logic may cause the GUI to provide an indication of proposed adjustments to the smart window system (e.g., add a range extender to a wireless mesh network, split the components, such as drivers 104, between two or more gateways 106, etc.). In another example, the processing logic may cause the GUI to provide an indication of the error (e.g., too many components, such as drivers 104, coupled to the same gateway 106, too large of distance between a component and the gateway, etc.).

At block 308, the processing logic determines application linking of the components of the smart window system. In some embodiments, the processing logic determines the application linking based on the electronic model (e.g., the electronic model indicates which EC windows 130 are in the same group or scene). In some embodiments, the processing logic determines the application linking based on user input (e.g., scanning each of the EC windows 130 that are to be part of the same group or scene, dragging and dropping a visual representation of the EC windows 130 to be in the same group or scene in the GUI, etc.).

In some embodiments, the processing logic compares one or more of the application linking or component locations to application capabilities (e.g., application best practices). For example, the processing logic may determine whether the electrochromic devices have an application linking because the EC windows are proximate each other (e.g., in the same frame, on the same façade, in the same office or conference room, on the same floor, in the same building, etc.). In another example, the processing logic may determine whether the electrochromic devices exceed an application capability (e.g., too many EC windows 130 in the same group or scene, etc.). Responsive to determining the application linking does not meet application capabilities (e.g., application best practices, performing troubleshooting), the processing logic may provide an alert (e.g., a suggestion to fix the error, verifying that the user desires this application linking, etc.). For example, the processing logic may verify that the user desires to add two electrochromic devices from two different areas (e.g., suites, rooms, frames, façades, floors, buildings) to the same group or scene. In some embodiments, the processing logic may determine that a grouping (e.g., group, scene, frame, cabinet) does not include any components and may provide an alert.

At block 310, the processing logic displays, via a GUI, the components of the smart window system, the physical linking, the network linking, and the application linking. In some embodiments, the GUI displays a list of the components, grouped by linking (e.g., tree of components). In some embodiments, the components may be displayed via the GUI grouped by wireless mesh network (e.g., distributed EMS 102, drivers 104, gateway 106, tint selector 120, interior sensor 206, etc.). In some embodiments, the components may be displayed in the GUI grouped by cabinet (e.g., distributed EMS 102, drivers 104, gateway 106, etc.), frame (e.g., EC windows 130), and sensor hub 126 (e.g., exterior sensors 216 and corresponding sensor hub 126). In some embodiments, the components may be displayed in the GUI grouped by physical proximity (e.g., per building, per floor, per suite, etc.). In some embodiments, the GUI may display details for each component (e.g., upon selection of that component), such as one or more of linking (e.g., physical, network, application), attributes (e.g., cable type, cable length, hardware identifier, modes, current status, manufacturing information, tint levels, device configuration), etc.

At block 312, the processing logic determines a first component of the components of the smart window system is to be replaced by a new component. In some embodiments, the processing logic periodically receives data from each of the components. Responsive to not receiving data from a first component for a threshold amount of time (e.g., and not receiving responses from the first component responsive to sending requests to the first component), the processing logic may determine that the first component is to be replaced. In some embodiments, responsive to determining errors of the first component (e.g., not responding correctly to requests, not charging or tinting correctly, providing more than a maximum amount of faults, etc.), the processing logic may determine that the first component is to be replaced. In some embodiments, responsive to not receiving data from components via a first component (e.g., not receiving data from drivers 104 via gateway 106, not receiving data from exterior sensors 216 via sensor hub 126, etc.), the processing logic may determine the first component is to be replaced. In some embodiments, the processing logic determines the first component is to be replaced by receiving an identifier corresponding to the first component. In some examples, an identifier (e.g., barcode, sticker, RFID tag, etc.) of the first component may be received (e.g., via scanning, via an RFID reader, optical imaging, etc.). In some embodiments, the processing logic receives user interaction with a GUI entry associated with the first component (e.g., deleting of the identifier associated with the first component from the GUI, selecting of the field that is or was associated with the first component, etc.). In some embodiments, the physical linking, network linking, and application linking associated with the first component is to be maintained in the GUI to be associated with the new component (e.g., although the identifier associated with the first component is deleted from the GUI, the physical linking, network linking, and application linking remain associated with the field in the GUI that was associated with the first component).

The processing logic may receive an identifier of the new component that is to replace the first component. In some embodiments, an identifier of the new component may be scanned. In some embodiments, the identifier may be entered in the GUI via user input. In some embodiments, the processing logic receives user input indicating that the identifier is to be associated with the field that was associated with the first component.

At block 314, the processing logic causes the new component to be configured based on configurations of the first component. The configurations of the first component may be associated with one or more of physical linking, network linking, or application linking of the first component. In some embodiments, the processing logic may identify a configuration file (e.g., stored on the cloud computing system 110, stored by the gateway 106, etc.) corresponding to the first component and may cause the new component to be configured based on the configuration file. The configuration file for an EC window 130 may indicate configurations of the EC window 130 with regards to the corresponding driver 104 (e.g., physical linking, network linking) and/or with regards to other EC windows 130 (e.g., application linking). The configuration file for an EC window 130 may indicate information, such as one or more of type of EC window 130, size of EC window 130, speed of tinting the EC window 130, group or scene associated with the EC window 130, etc. The configuration file for a driver 104 may indicate configurations of the driver 104 with regards to the corresponding electrochromic device (e.g., physical linking, application linking, type of EC window 130, size of EC window 130, speed of tinting the EC window 130, group or scene associated with the EC window 130, etc.) and/or with regards to a corresponding gateway 106 (e.g., physical linking, network linking). The configuration file for a gateway 106 may indicate configurations of the gateway 106 with regards to the components that are coupled to the gateway 106 (e.g., physical linking, network linking), which types of data are to be transmitted to the cloud computing system 110 upon receipt, which types of data are to be stored in a file to be transmitted periodically, default schedules or settings, etc. The configuration file for a sensor hub 126 may indicate configurations of the sensor hub 126 with regards to exterior sensors 216 that are coupled to the sensor hub 126 (e.g., physical linking), how often sensor data is to be transmitted to the cloud computing system 110, sensor data is to be transmitted to the cloud computing system 110 at which times of day, how different types of sensor data are to be transmitted to the cloud computing system 110, etc.

In some embodiments, the processing logic may determine whether the first component is replaceable by the new component (e.g., based on identifiers of the first and new components, based on the first and new components being compatible). In some embodiments, a new component can be used to replace a first component of a similar version and/or hardware type. For example, a new driver having a first amount of drives (e.g., four drives) may replace a first driver that has an equal or lesser amount of drives (e.g., two drives). In another example, a new driver having a second amount of drives (e.g., two drives) cannot replace a first driver that has a greater amount of drives (e.g., four drives). Each drive of a driver may be used to control a separate EC window or two or more drives may be used to control the same EC window.

In some embodiments, one component may control multiple other components. For example, a single driver may control two or more EC windows. In some embodiments, the processing logic causes a new driver to be configured to control the two or more EC windows that were controlled by the previous driver.

In some embodiments, a new component may be different from the previous component that the new component is replacing. For example, a smaller EC window may be replaced by a larger EC window. The processing logic may determine the requirements of the new component and may determine whether the other components of the electrochromic window system can support the new component. For example, if the new component is a larger EC window that is to be controlled by two drives, the processing logic may determine whether there are two drives available to control the larger EC window. Responsive to determining the other components of the electrochromic window system cannot support the new component, the processing logic may provide an alert (e.g., via the GUI). The alert may indicate a corrective action that is to be performed (e.g., replace the existing driver with a driver with more drives, add a new driver, provide a physical connection from two drivers to the larger EC window, etc.).

The processing logic may determine that a component is not performing (e.g., transmitting data, tinting, etc.) when or how it is directed. The processing logic may receive data (e.g., a data tree) and may determine where the error started (e.g., gateway stopped transmitting data on a specific day and at a specific time). The processing logic may determine a corrective action based on where the error started. The processing logic may provide an alert (e.g., via the GUI) indicating one or more of the component where the error originated, when the error started, and/or a corrective action to correct the error.

The processing logic may determine updated settings for one or more components based on replacing a first component with a new component that is different from the first component. In some embodiments, if the new component is an EC window that has a different speed of tinting, different power requirements, and/or the like than the existing EC window that is being replaced, the processing logic may determine an updated speed of tinting for a group of EC windows (e.g., application linking, façade) of which the new EC window will be part. For example, if a new EC window has a slower speed of tinting, the processing logic may determine to slow the tinting of the entire façade of EC windows. In another example, if a new EC window has a higher power requirement, the processing logic may determine to slow the tinting of the entire façade of EC windows (e.g., based on power availability of the site, based on user priorities of power consumption vs. speed, etc.).

At block 316, the processing logic updates the GUI based on the new component. The processing logic may update the GUI with information (e.g., the identifier, configurations, etc.) of the new component.

The processing logic may determine the current state (e.g., online, mode, current tint level, changing tint level, faults, etc.) of each of the components and may update the GUI based on the current state of each of the components. The processing logic may receive, via the GUI, user input associated with linking of the components (e.g., application linking, etc.) and may update the GUI based on the user input. For example, upon receiving user input of adding the EC windows 130a and 130b to the same group, the GUI may be updated to reflect the EC windows 130a and 130b are in the same group. Subsequent to updating the GUI, the windows 130a and 130b may all change to a first tint level responsive to corresponding drivers 104 receiving user input via tint selector 120.

In some embodiments, the processing logic may determine a hierarchy (e.g., tree structure) of the components based on one or more of physical linking, network linking, or application linking. The processing logic may store the hierarchy in a database on the cloud computing system 110. The hierarchy may be used for performing glare control, installation, replacement of components, maintenance, grouping, sending instructions to components (e.g., clearing all EC windows 130 in a building), etc.

FIGS. 4A-J are GUIs for cloud-based component linking, according to certain embodiments. In some embodiments, at least a first portion of information in one or more of the FIGS. 4A-J may be obtained based on receiving and processing an electronic model of at least a portion of the building. In some embodiments, at least a second portion of information in one or more of the FIGS. 4A-J may be input via user input. In some embodiments, at least a third portion of information in one or more of the FIGS. 4A-J may be obtained based on one or more of a configuration file (e.g., of a driver, gateway, sensor hub, etc.), settings files (e.g., a schedule, rules, etc.), etc. In some embodiments, the cloud computing system 110 may cause a new component to be configured based on configurations (e.g., of a previous component) in one or more of FIGS. 4A-J. In some embodiments, the cloud computing system 110 may configure or update linking of components (e.g., application linking of EC windows) based on user input via one or more of FIGS. 4A-J. In some embodiments, the cloud computing system 110 may perform troubleshooting (e.g., provide alerts to the user) via one or more of FIGS. 4A-J (e.g., alert the user of too many drivers for one network or distributed EMS, etc.). In some embodiments, one or more of FIGS. 4A-J may display a current state (e.g., online, changing tint level, updating software, transmitted data within a threshold amount of time, etc.) of one or more of the components.

Figure 4A:
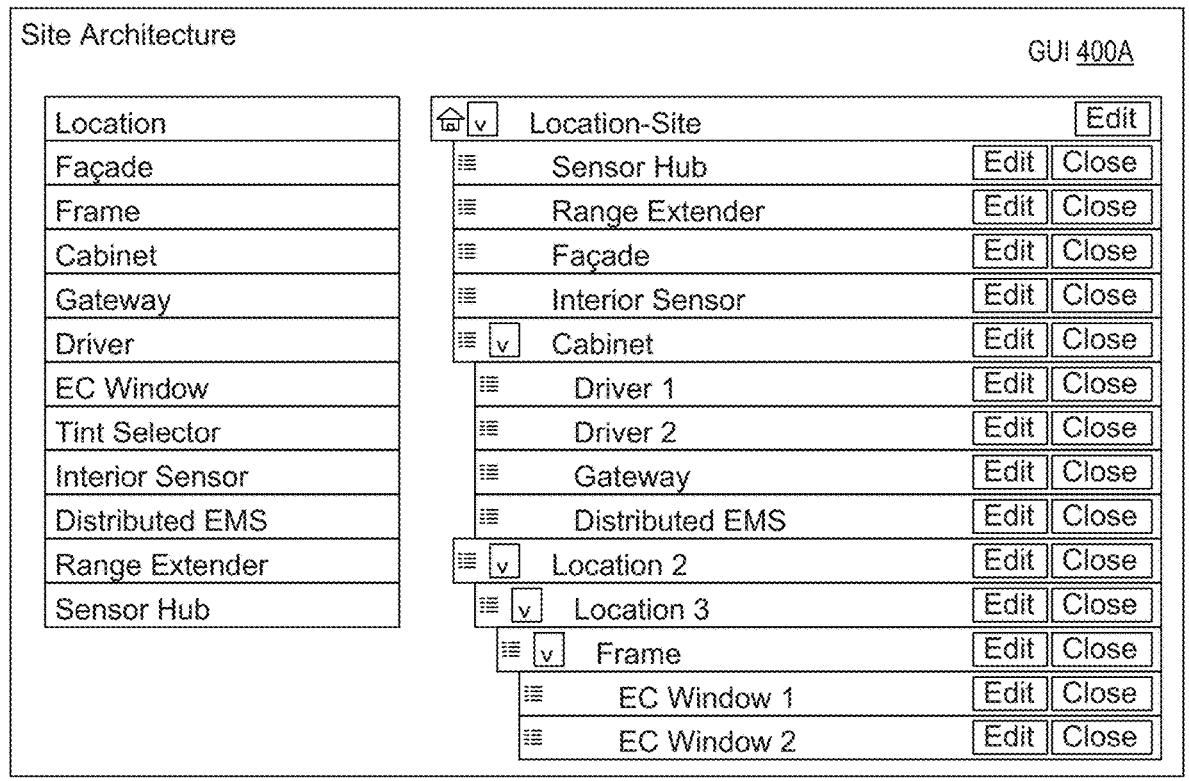

FIG. 4A is a GUI 400A that displays site architecture of an electrochromic window system (e.g., one or more of electrochromic window system 100 of FIG. 1, electrochromic window system 200 of FIG. 2, smart window system, etc.). A list of potential components (e.g., displayed via GUI 400A) for the site architecture may include location, façade, frame cabinet, gateway, driver, EC window, tint selector (e.g., keypad), interior sensor (e.g., light sensor), distributed EMS, range extender, and sensor hub.

The components of the site architecture may be organized in a hierarchy (e.g., tree structure) and may be displayed via the GUI 400A. In some embodiments, under a location of the site (e.g., building, suite, office space, etc.), there may be a sensor hub, range extender, façade, interior sensor, and cabinet. In some embodiments, under a second location (e.g., floor), there may be third location (e.g., office) on that second location. The cabinet may include one or more of a driver 1, driver 2, gateway, or distributed EMS. The third location (e.g., office) may include a frame. The frame may include EC window 1 and EC window 2.

In some embodiments, components may be added to the hierarchy by dragging components from the list of the site architecture to the hierarchy. For example, EC window may be selected from the list of site architecture and may be dragged to a portion of the hierarchy (e.g., frame on location 3) to add an EC window to the hierarchy.

The hierarchy includes a tree structure, a name of the component, a first graphical element (e.g., pencil) for editing a component, a second graphical element (e.g., an "x") for deleting a component. By selecting a component, further details may be displayed.

FIG. 4B is a GUI 400B that displays details of the sensor hub, according to certain embodiments. FIG. 4B may be displayed responsive to user input selecting the sensor hub in the hierarchy displayed on one or more of the GUIs. GUI 400B may display the actual name, the user created name, the part ID, and the hardware ID of the sensor hub. In some embodiments, GUI 400B displays the exterior sensors that are physically linked to the sensor hub. In some embodiments, GUI 400B displays configurations of the sensor hub.

FIG. 4C is a GUI 400C that displays details of the range extender, according to certain embodiments. FIG. 4C may be displayed responsive to user input selecting the range extender in the hierarchy displayed on one or more of the GUIs. GUI 400C may display the actual name, the user created name, the part ID, the hardware ID, and links of the range extender. In some embodiments, the links include the network linking (e.g., linked to which wireless mesh network, linked via network to which gateway, etc.) of the range extender. In some embodiments, a user may select the gateway to which the range extender is (or is to be) network linked via a drop down selection.

FIG. 4D is a GUI 400D that displays details of the façade, according to certain embodiments. FIG. 4D may be displayed responsive to user input selecting the façade in the hierarchy displayed on one or more of the GUIs. A façade may be a portion of a building (e.g., an exterior wall, an exterior wall on one floor, a portion of an exterior wall on one floor, a wall corresponding to an office or conference room, etc.). GUI 400D may display the actual name, the user created name, the orientation (e.g., North, East, South, West, etc.), inclination (e.g., vertical, external leaning, internal leaning, etc.), and components linked to the façade. For example, first and second EC windows may have an application linking to the façade. In some embodiments, the GUI 400D indicates whether the EC windows in the façade are part of the same group, scene, etc.

FIG. 4E is a GUI 400E that displays details of the interior sensor (e.g., light sensor, occupancy sensor, etc.), according to certain embodiments. FIG. 4E may be displayed responsive to user input selecting the interior sensor in the hierarchy displayed on one or more of the GUIs. GUI 400E may display the actual name, the user created name, the part ID, the hardware ID, and links of the interior sensor. In some embodiments, the links include the network linking (e.g., linked to which wireless mesh network, linked via network to which gateway, etc.) of the interior sensor. In some embodiments, a user may select the gateway to which the interior sensor is (or is to be) network linked via a drop down selection.

FIG. 4F is a GUI 400F that displays details of the first driver, according to certain embodiments. FIG. 4F may be displayed responsive to user input selecting the first driver in the hierarchy displayed on one or more of the GUIs. GUI 400F may display the actual name, the user created name, the part ID, the hardware ID, device configuration, links of the first driver. In some embodiments, the device configuration displayed via GUI 400F include one or more of positive volt drive limit, negative volt drive limit, positive volt sense limit, negative volt sense limit, etc. In some embodiments, the device configuration is entered via user input. In some embodiments, the device configuration is pre-filled by the cloud computing system 110 (e.g., responsive to using a configuration file of a previous driver, etc.). In some embodiments, the links include the network linking (e.g., linked to which wireless mesh network, linked via network to which gateway, etc.) of the first driver. In some embodiments, a user may select the gateway to which the first driver is (or is to be) network linked via a first drop down selection. In some embodiments, the links include the physical linking (e.g., linked to which distributed EMS, EC window, etc.) of the first driver. In some embodiments, a user may select the distributed EMS via a second drop down selection and the EC window via a third drop down selection for the physical linking of the first driver.

FIG. 4G is a GUI 400G that displays details of the gateway, according to certain embodiments. FIG. 4G may be displayed responsive to user input selecting the gateway in the hierarchy displayed on one or more of the GUIs. GUI 400G may display the actual name, the user created name, the part ID, the hardware ID, device configuration, thread configuration, and links of the gateway. In some embodiments, the device configuration displayed via GUI 400G includes the node summary push interval (e.g., how often the gateway is to transmit a summary of activity of components on the same wireless mesh network). The thread configuration may include the thread channel (e.g., wireless mesh network) to which the gateway is coupled. In some embodiments, the device configuration and thread configuration are pre-filled by the cloud computing system 110 (e.g., responsive to using a configuration file of a previous gateway, etc.). In some embodiments, the links include the physical linking (e.g., linked to which distributed EMS, etc.) of the gateway. In some embodiments, a user may select the distributed EMS via a first drop down selection for the physical linking of the gateway. In some embodiments, the links include the network linking (e.g., linked to which wireless mesh network, linked via network to which components, etc.) of the gateway. In some embodiments, the GUI 400G (e.g., responsive to user selection, based on the configuration file, etc.) may display the drivers, interior sensors, range extender, and distributed EMS to which the gateway is (or is to be) network linked via corresponding drop down selections. The GUI 400G may have an option to remove the network linking of the gateway to one or more components.

FIG. 4H is a GUI 400H that displays details of the distributed EMS, according to certain embodiments. FIG. 4H may be displayed responsive to user input selecting the distributed EMS in the hierarchy displayed on the one or more of the GUIs. GUI 400H may display the actual name, the user created name, the part ID, the hardware ID, and links of the distributed EMS. In some embodiments, the links include the network linking (e.g., linked to which gateway, wireless mesh network, etc.) of the distributed EMS. In some embodiments, a user may select the gateway via a first drop down selection for the network linking of the distributed EMS. In some embodiments, the links include the physical linking (e.g., linked to which gateway and drivers, power linking, etc.) of the distributed EMS. In some embodiments, a user may select the gateway via a second drop down selection, a first driver via a third drop down selection, and a second driver via a fourth drop down selection for the physical linking of the distributed EMS. In some embodiments, the GUI 400H (e.g., responsive to user selection, based on the configuration file, etc.) may display the drivers and gateway to which the distributed EMS is (or is to be) physically linked. The GUI 400H may have an option to remove the physical linking of the distributed EMS to one or more components.

FIG. 4I is a GUI 400I that displays details of the first EC window, according to certain embodiments. FIG. 4I may be displayed responsive to user input selecting the first EC window in the hierarchy displayed on one or more of the GUIs. GUI 400I may display the actual name, the user created name, the part ID, cable length, device configuration, and links of the first EC window. In some embodiments, the device configuration displayed via GUI 400I includes the maximum tint level (e.g., 100% tinted) and the minimum tint level (e.g., 0% tinted, clear). The maximum and minimum tint levels may be input to the GUI 400I via user input. The links may include physical linking (e.g., to first driver) and application linking (e.g., to façade). The GUI 400I may also display mask image (e.g., obstruction mapping, what parts of the window sunlight can come through, an image). The GUI 400I may also display target set point lower and upper direct normal irradiance (DNI) thresholds (e.g., the target set point for DNI values below the low threshold are set point 0, the target set point for DNI values above the high threshold are set point 8). The GUI 400I may also display position factor weighting (e.g., position factor weighting affects the transmitted DNI values and may be between 0 and 1.0, a position factor weighting closer to 0 helps reduce glare when the incident angle of the sun with respect to the window is low), etc.

FIG. 4J is a GUI 400J that displays further details of the first EC window, according to certain embodiments. FIG. 4J may be displayed responsive to user input selecting the first EC window and scrolling down from FIG. 4I to FIG. 4J. GUI 400J may display obstruction mask parameters (e.g., dimensions in meters, for glare control), such as header height, sill height, jamb depth, window width, overhang depth, overhang height above window header, extension to left, extension to right, propagation distance, propagation height, etc.

Figure 5:
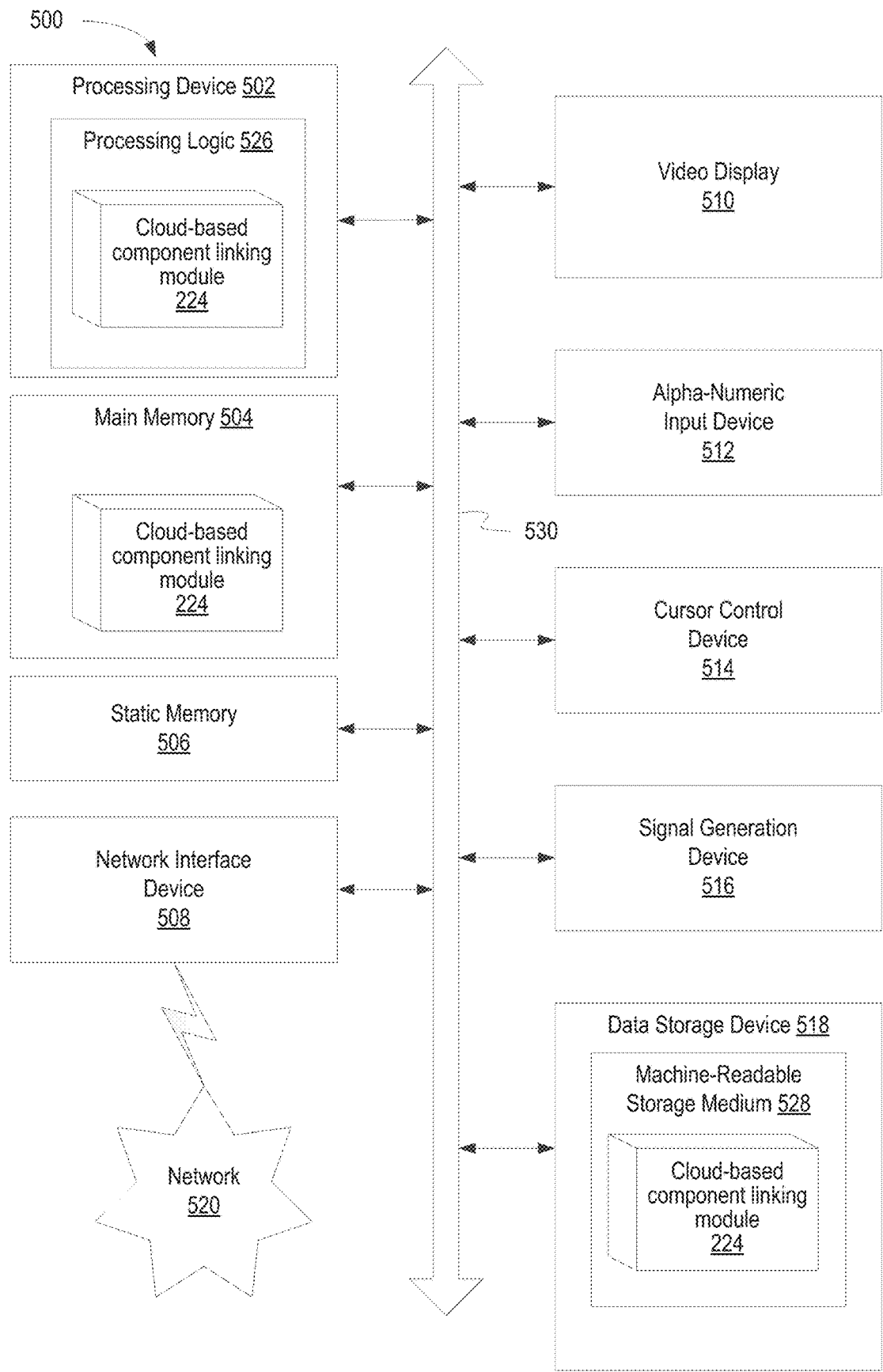
FIG. 5 illustrates a diagrammatic representation of a machine in the example form of a computer system including a set of instructions executable by a computer system for cloud-based component linking according to any one or more of the methodologies discussed herein.

FIG. 5 illustrates a diagrammatic representation of a machine in the example form of a computer system including a set of instructions executable by a computer system 500 for cloud-based component linking according to any one or more of the methodologies discussed herein. In some embodiments, computer system 500 is a server device of a cloud computing system (e.g., cloud computing system 110 of one or more of FIGS. 1-3). The computer system 500 may have more or less components than those shown in FIG. 5 (e.g., server device of cloud computing system 110 may have fewer components than shown in computer system 500). In one embodiment, the computer system may include instructions to enable execution of the processes and corresponding components shown and described in connection with FIGS. 1-4.

In alternative embodiments, the machine may be connected (e.g., networked) to other machines in a LAN, an intranet, an extranet, or the Internet. The machine may operate in the capacity of a server machine in a client-server network environment. The machine may be a personal computer (PC), a set-top box (STB), a server, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein The example computer system 500 (e.g., cloud computing system 110) includes a processing device (processor) 502, a main memory 504 (e.g., read-only memory (ROM), flash memory, dynamic random access memory (DRAM) such as synchronous DRAM (SDRAM)), a static memory 506 (e.g., flash memory, static random access memory (SRAM)), and a data storage device 518, which communicate with each other via a bus 530.

Processing device 502 represents one or more general-purpose processing devices such as a microprocessor, central processing unit, or the like. More particularly, the processing device 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 502 may also be one or more special-purpose processing devices such as an application specific integrated circuit (ASIC), a field programmable gate array (FPGA), a digital signal processor (DSP), network processor, or the like. In various implementations of the present disclosure, the processing device 502 is configured to execute instructions for performing the operations and processes described herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The data storage device 518 may include a computer-readable storage medium 528 (or machine-readable medium) on which is stored one or more sets of instructions embodying any one or more of the methodologies or functions described herein. The instructions may also reside, completely or at least partially, within the main memory 504 and/or within processing logic 526 of the processing device 502 during execution thereof by the computer system 500, the main memory 504 and the processing device 502 also constituting computer-readable media.

The instructions may further be transmitted or received over a network 520 via the network interface device 508. While the computer-readable storage medium 528 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely presented as examples. Particular implementations may vary from these example details and still be contemplated to be within the scope of the present disclosure. In the above description, numerous details are set forth.

It will be apparent, however, to one of ordinary skill in the art having the benefit of this disclosure, that embodiments of the disclosure may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to the desired result. The steps are those requiring physical manipulations of physical quantities. Usually, though not necessarily, these quantities take the form of electrical, magnetic, or optical signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying," "determining," "displaying," "determining," "causing," "updating," "receiving," "configuring," "performing," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the disclosure also relate to an apparatus for performing the operations herein. This apparatus may be specially constructed for the required purposes, or it may comprise a general purpose computer selectively activated or reconfigured by a computer program stored in the computer. Such a computer program may be stored in a computer-readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the present disclosure as described herein. It should also be noted that the terms "when" or the phrase "in response to," as used herein, should be understood to indicate that there may be intervening time, intervening events, or both before the identified operation is performed.

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
   receiving an electronic model of at least a portion of a building;
   identifying, by a processing device based on the electronic model of the at least a portion of the building, a plurality of components of a smart window system, the plurality of components comprising a plurality of electrochromic devices, a plurality of drivers, and a gateway, wherein each driver of the plurality of drivers is to control a corresponding electrochromic device, and wherein each driver of the plurality of drivers is to receive corresponding instructions from the gateway via a first wireless network, the gateway having received the corresponding instructions via a second wireless network from a cloud computing system that is remote from the gateway;
   determining a first physical linking of a first electrochromic device of the plurality of electrochromic devices to a first driver of the plurality of drivers via a first wired connection, a first network linking of the first driver to the gateway via the first wireless network, and application linking of two or more of the plurality of electrochromic devices that are to be controlled together;
   causing a user device to display, via a graphical user interface (GUI), a graphical representation of: the plurality of components of the smart window system; the first physical linking of the first electrochromic device to the first driver via the first wired connection; the first network linking of the first driver to the gateway via the first wireless network; and the application linking;
   determining a first component of the plurality of components is to be replaced by a new component, wherein configurations of the first component are based on one or more of the first physical linking, the first networking linking, or the application linking;
   causing the new component to be configured based on the one or more of the first physical linking, the first networking linking, or the application linking of the first component; and
   updating the GUI based on the new component that has been configured based on the one or more of the first physical linking, the first networking linking, or the application linking of the first component.

2. The method of claim 1, wherein:
   the first component is the first electrochromic device, the first driver, or the gateway.

3. The method of claim 1, wherein the determining of the first physical linking is based on the electronic model of the at least a portion of the building.

4. The method of claim 1 further comprising:
responsive to user input via the GUI, configuring the application linking of the two or more of the plurality of electrochromic devices that are to be controlled together.

5. The method of claim 1 further comprising:
receiving user input via the GUI; and
performing, based on the user input, troubleshooting of one or more of the first physical linking, the first network linking, or the application linking.

6. The method of claim 1 further comprising:
displaying a corresponding current state of each of the components of the smart window system via the GUI.

7. A system comprising:
a memory; and
a processing device coupled to the memory, wherein the processing device is to:
receive an electronic model of at least a portion of a building;
identify, based on the electronic model of the at least a portion of the building, a plurality of components of a smart window system, the plurality of components comprising a plurality of electrochromic devices, a plurality of drivers, and a gateway, wherein each driver of the plurality of drivers is to control a corresponding electrochromic device, and wherein each driver of the plurality of drivers is to receive corresponding instructions from the gateway via a first wireless network, the gateway having received the corresponding instructions from a cloud computing system that is remote from the gateway;
determine a first physical linking of a first electrochromic device of the plurality of electrochromic devices to a first driver of the plurality of drivers via a first wired connection, a first network linking of the first driver to the gateway via the first wireless network, and application linking of two or more of the plurality of electrochromic devices that are to be controlled together;
cause a user device to display, via a graphical user interface (GUI), a graphical representation of: the plurality of components of the smart window system; the first physical linking of the first electrochromic device to the first driver via the first wired connection; the first network linking of the first driver to the gateway via the first wireless network; and the application linking;
determine a first component of the plurality of components is to be replaced by a new component, wherein configurations of the first component are based on one or more of the first physical linking, the first networking linking, or the application linking;
cause the new component to be configured based on the one or more of the first physical linking, the first networking linking, or the application linking of the first component; and
update the GUI based on the new component that has been configured based on the one or more of the first physical linking, the first networking linking, or the application linking of the first component.

8. The system of claim 7, wherein:
the first component is the first electrochromic device, the first driver, or the gateway.

9. The system of claim 7, wherein the processing device is to determine the first physical linking based on the electronic model of the at least a portion of the building.

10. The system of claim 7, wherein the processing device is further to:
responsive to user input via the GUI, configure the application linking of the two or more of the plurality of electrochromic devices that are to be controlled together.

11. The system of claim 7, wherein the processing device is further to:
receive user input via the GUI; and
perform, based on the user input, troubleshooting of one or more of the first physical linking, the first network linking, or the application linking.

12. The system of claim 7, wherein the processing device is further to:
display a corresponding current state of each of the components of the smart window system via the GUI.

13. A non-transitory machine-readable storage medium storing instructions which, when executed cause a processing device to perform operations comprising:
receiving an electronic model of at least a portion of a building;
identifying, based on the electronic model of the at least a portion of the building, a plurality of components of a smart window system, the plurality of components comprising a plurality of electrochromic devices, a plurality of drivers, and a gateway, wherein each driver of the plurality of drivers is to control a corresponding electrochromic device, and wherein each driver of the plurality of drivers is to receive corresponding instructions from the gateway via a first wireless network, the gateway having received the corresponding instructions via a second wireless network from a cloud computing system that is remote from the gateway;
determining a first physical linking of a first electrochromic device of the plurality of electrochromic devices to a first driver of the plurality of drivers via a first wired connection, a first network linking of the first driver to the gateway via the first wireless network, and application linking of two or more of the plurality of electrochromic devices that are to be controlled together;
causing a user device to display, via a graphical user interface (GUI), a graphical representation of: the plurality of components of the smart window system; the first physical linking of the first electrochromic device to the first driver via the first wired connection; the first network linking of the first driver to the gateway via the first wireless network; and the application linking;
determining a first component of the plurality of components is to be replaced by a new component, wherein configurations of the first component are based on one or more of the first physical linking, the first networking linking, or the application linking;
causing the new component to be configured based on the one or more of the first physical linking, the first networking linking, or the application linking of the first component; and
updating the GUI based on the new component that has been configured based on the one or more of the first physical linking, the first networking linking, or the application linking of the first component.

14. The non-transitory machine-readable storage medium of claim 13, wherein the first component is the first electrochromic device, the first driver, or the gateway.

15. The non-transitory machine-readable storage medium of claim 13, wherein the determining of the first physical linking is based on the electronic model of the at least a portion of the building.

16. The non-transitory machine-readable storage medium of claim 13, wherein the operations further comprise:
responsive to user input via the GUI, configuring the application linking of the two or more of the plurality of electrochromic devices that are to be controlled together.

17. The non-transitory machine-readable storage medium of claim 13, wherein the operations further comprise:
receiving user input via the GUI; and
performing, based on the user input, troubleshooting of one or more of the first physical linking, the first network linking, or the application linking.

* * * * *